(12) United States Patent
Nam et al.

(10) Patent No.: US 11,750,849 B2
(45) Date of Patent: *Sep. 5, 2023

(54) METHOD FOR PARTITIONING BLOCK INCLUDING IMAGE AND DEVICE THEREFOR

(71) Applicant: LG ELECTRONICS INC., Seoul (KR)

(72) Inventors: Junghak Nam, Seoul (KR); Seunghwan Kim, Seoul (KR); Jaehyun Lim, Seoul (KR); Hyeongmoon Jang, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/577,785

(22) Filed: Jan. 18, 2022

(65) Prior Publication Data

US 2022/0141498 A1 May 5, 2022

Related U.S. Application Data

(63) Continuation of application No. 17/073,047, filed on Oct. 16, 2020, now Pat. No. 11,272,221, which is a
(Continued)

(30) Foreign Application Priority Data

Jun. 27, 2018 (KR) ........................ 10-2018-0074072
Jun. 27, 2018 (KR) ........................ 10-2018-0074224

(51) Int. Cl.
*H04N 19/00* (2014.01)
*H04N 19/96* (2014.01)
(Continued)

(52) U.S. Cl.
CPC ........... *H04N 19/96* (2014.11); *H04N 19/119* (2014.11); *H04N 19/176* (2014.11); *H04N 19/70* (2014.11)

(58) Field of Classification Search
CPC .... H04N 19/176; H04N 19/119; H04N 19/96; H04N 19/70; G06T 9/00; G06T 9/004
See application file for complete search history.

(56) References Cited

U.S. PATENT DOCUMENTS

2011/0103701 A1   5/2011  Cheon
2018/0139444 A1   5/2018  Huang et al.
(Continued)

FOREIGN PATENT DOCUMENTS

KR        101662739      10/2016
KR        20170124477    11/2017
(Continued)

OTHER PUBLICATIONS

Office Action in Japanese Appln. No. 2020-557273, dated Jul. 19, 2022, 11 pages (with English translation).
(Continued)

*Primary Examiner* — Li Liu
(74) *Attorney, Agent, or Firm* — Fish & Richardson P.C

(57) ABSTRACT

Disclosed are a method for decoding a video signal and an apparatus therefor. Specifically, a method for decoding an image may include: partitioning a current coding tree block into a plurality of coding blocks so that coding blocks partitioned from the current coding tree block are included in a current picture when the current coding tree block is out of a boundary of the current picture; parsing a first syntax element indicating whether a current coding block is partitioned into a plurality of subblocks when the current coding
(Continued)

block satisfies a predetermined condition; and determining a split mode of the current coding block based on the syntax element.

10 Claims, 17 Drawing Sheets

Related U.S. Application Data continuation of application No. PCT/KR2019/004750, filed on Apr. 19, 2019.

(60) Provisional application No. 62/659,722, filed on Apr. 19, 2018.

(51) Int. Cl.
  *H04N 19/119*   (2014.01)
  *H04N 19/176*   (2014.01)
  *H04N 19/70*    (2014.01)

(56) References Cited

U.S. PATENT DOCUMENTS

| | | | |
|---|---|---|---|
| 2019/0246107 A1* | 8/2019 | Leleannec | H04N 19/119 |
| 2020/0186805 A1 | 6/2020 | Lee | |
| 2020/0195924 A1 | 6/2020 | Hsiang | |
| 2020/0275122 A1 | 8/2020 | Ahn et al. | |
| 2020/0296366 A1 | 9/2020 | Chono | |
| 2020/0304788 A1 | 9/2020 | He et al. | |
| 2020/0336762 A1 | 10/2020 | Lee et al. | |
| 2020/0366900 A1 | 11/2020 | Jun et al. | |
| 2022/0021879 A1* | 1/2022 | Leleannec | H04N 19/136 |

FOREIGN PATENT DOCUMENTS

| | | |
|---|---|---|
| KR | 20170133026 | 12/2017 |
| KR | 20180031615 | 3/2018 |
| WO | WO2017123980 | 7/2017 |
| WO | WO2017157249 | 9/2017 |
| WO | WO2017195667 | 11/2017 |
| WO | WO2018066927 | 4/2018 |

OTHER PUBLICATIONS

Editors, "Algorithm description for Versatile Video Coding and Test Model 2 (VTM 2)," JVET-K1002-v1, Joint Video Experts Team (JVET) of ITU-T SG WP3 and ISO/IEC JTC 1/SC 29/WG 11, Ljubljana, SI, Jul. 10-18, 2018, 16 pages, XP030193537.

Extended European Search Report in European Appln. No. 19788245.9.8, dated Dec. 17, 2020, 12 pages.

Gao et al., "Improving Picture Boundary Handling for Video Coding Beyond H EVC," 2018 IEEE Visual Communications and Image Processing (VCIP), Dec. 2018, 4 pages.

Hsu et al., "Description of SDR video coding technology proposal by MediaTek," JVET-J0018, Presented at Joint Video Experts Team (JVET) of ITU-T SG 16 WP 3 and ISO/IEC JTC 1/SC 29/WG 11, 10th Meeting: San Diego, US, Apr. 10-20, 2018, 64 pages.

International Search Report in International Appln. No. PCT/KR2019/004750, dated Aug. 20, 2019, 7 pages (with English translation).

Leannec et al., "Highly Flexible Coding Structures for Next Generation Video Compression Standard," Institute of Electrical and Electronics Engineers, 2019 Data Compression Conference (DCC), dated 2019, 10 pages, XP033548458.

Office Action in Japanese Appln. No. 2020-557273, dated Dec. 7, 2021, 9 pages (with English translation).

Qualcomm, Inc., "Multi-Type-Tree," JVET-D0117r1, Joint Video Exploration Team (JVET) of ITU-T SG WP3 and ISO/IEC JTC 1/SC 29/WG 11, Chengdu, CN, Oct. 15-21, 2016, 3 pages, XP030257764.

Qualcomm, Technicolor, "Partition only software of the video coding technology proposal by Qualcomm and Technicolor," JVET-J0075r1, Joint Video Exploration Team (JVET) of ITU-T SG 16 WP3 and ISO/IEC JTC 1/SC 29/WG 11, San Diego, US, Apr. 10-20, 2018, 6 pages, XP030151271.

Wu et al., "Description of SDR video coding technology proposal by University of Science and Technology of China, Peking University, Harbin Institute of Technology, and Wuhan University (IEEE 1857.10 Study Group)," JVET-J0032-v2, Presented at Joint Video Experts Team (JVET) of ITU-T SG 16 WP 3 and ISO/IEC JTC 1/SC 29/WG 11, 10th Meeting: San Diego, US, Apr. 10-20, 2018, 48 pages.

* cited by examiner (1)

(2)

(3)

(4)

(5)

(6)

(7)

(8)

(9)

(10)

(1)　　　　　(2)　　　　　(3)

(4)　　　　　(5)　　　　　(6)

(1)　　　　　(2)　　　　　(3)

(1)　　　　　(2)　　　　　(3)

(1) (2)

(1)

(2)

(3)

(4)

(5)

(6)

(7)

(8)

(9)

(10)

(11)

(12)

(13)　　　　　(14)　　　　　(15)　　　　　(16)

(17)　　　　　(18)　　　　　(19)　　　　　(20)

(21)　　　　　(22)　　　　　(23)　　　　　(24)

(25)

(26)

(27)

(28)

(29)

(30)

(31)

(32)

METHOD FOR PARTITIONING BLOCK INCLUDING IMAGE AND DEVICE THEREFOR

CROSS-REFERENCE TO RELATED APPLICATIONS

This application is a continuation application of U.S. application Ser. No. 17/073,047, file don Oct. 16, 2020, which is a continuation of International Application No. PCT/KR2019/004750, filed on Apr. 19, 2019, which claims the benefit of U.S. Provisional Application No. 62/659,722, filed on Apr. 19, 2018, and Korean Applications No. 10-2018-0074072, filed on Jun. 27, 2018 and No. 10-2018-0074224, filed on Jun. 27, 2018, the contents of which are all hereby incorporated by reference herein in their entirety.

TECHNICAL FIELD

The present disclosure relates to a method for processing a still image or a moving picture, and more particularly, to a method for determining a partitioning structure of a block in which encoding/decoding is performed and an apparatus supporting the same.

BACKGROUND

Compression encoding means a series of signal processing techniques for transmitting digitized information through a communication line or techniques for storing information in a form suitable for a storage medium. The medium including a picture, an image, audio, etc. may be a target for compression encoding, and particularly, a technique for performing compression encoding on a picture is referred to as video image compression.

Next-generation video contents are supposed to have the characteristics of high spatial resolution, a high frame rate and high dimensionality of scene representation. In order to process such contents, a drastic increase in the memory storage, memory access rate and processing power will result.

Accordingly, it is required to design a coding tool for processing next-generation video contents efficiently.

SUMMARY

An embodiment of the present disclosure proposes a method for efficiently adjusting block partitioning in performing the block partitioning in a QTBT structure.

The technical objects of the present disclosure are not limited to the aforementioned technical objects, and other technical objects, which are not mentioned above, will be apparently appreciated by a person having ordinary skill in the art from the following description.

In an aspect, provided is a method for decoding an image, which may include: when a current coding tree block is out of a boundary of a current picture, partitioning the current coding tree block into a plurality of coding blocks so that coding blocks partitioned from the current coding tree block are included in a current picture; when a current coding block satisfies a predetermined condition, parsing a first syntax element indicating whether the current coding block is partitioned into a plurality of subblocks; when the first syntax element indicates that the current coding block is partitioned, parsing a second syntax element indicating whether the current coding block is partitioned by using a quad-tree structure; when the second syntax element indicates that the current coding block is not partitioned by using the quad-tree structure, parsing at least one of a third syntax element indicating whether the current coding block is partitioned by using a binary-tree structure or whether the current coding block is partitioned by using a ternary-tree structure and a fourth syntax element indicating a split direction of the current coding block; and determining a split mode of the current coding block based on at least one of the first syntax element, the second syntax element, the third syntax element, and the fourth syntax element.

Preferably, the partitioning of the current coding tree block into the plurality of coding blocks may be performed by partitioning the current coding tree block into a plurality of coding blocks by using the binary-tree structure or the ternary-tree structure until reaching a valid region in the current coding tree block, and here, the valid region may represent a region which belongs to the boundary of the current picture in the current coding tree block.

Preferably, the partitioning of the current coding block into the plurality of coding blocks may further include when the current coding tree block is out of the boundary of the current picture, parsing a fifth syntax element indicating whether quad-tree splitting is allowed, and when the fifth syntax element indicates that the quad-tree splitting is not allowed, the current coding tree block may be partitioned into the plurality of coding blocks by using the binary-tree structure or the ternary-tree structure.

Preferably, the fifth syntax element may be signaled through a Sequence Parameter Set, a Picture Parameter Set, a Tile Group Header, or a header of a Network Abstract Layer unit.

Preferably, the partitioning of the current coding tree block into the plurality of coding blocks may be performed by partitioning the current coding tree block into a plurality of coding blocks by using the binary-tree structure or the ternary-tree structure until reaching the valid region in the current coding tree block, and here, the valid region may represent the region which belongs to the boundary of the current picture in the current coding tree block.

Preferably, the partitioning of the current coding block into the plurality of coding blocks may be performed by partitioning the current coding tree block into the coding blocks by using the quad-tree structure when a width of the valid region is larger than a maximum transform size or a height of the valid region is larger than the maximum transform size.

In another aspect, provided is an apparatus for decoding an image, which may include: when a current coding tree block is out of a boundary of a current picture, a coding tree block partitioning unit partitioning the current coding tree block into a plurality of coding blocks so that coding blocks partitioned from the current coding tree block are included in a current picture; a syntax element parsing unit parsing, when a current coding block satisfies a predetermined condition, a first syntax element indicating whether the current coding block is partitioned into a plurality of subblocks, when the first syntax element indicates that the current coding block is partitioned, parsing a second syntax element indicating whether the current coding block is partitioned by using a quad-tree structure, and when the second syntax element indicates that the current coding block is not partitioned by using the quad-tree structure, parsing at least one of a third syntax element indicating whether the current coding block is partitioned by using a binary-tree structure or whether the current coding block is partitioned by using a ternary-tree structure and a fourth syntax element indicating a split direction of the current coding block; and a split mode determining unit determining a split mode of the current coding block based on at least one of the first syntax element, the second syntax element, the third syntax element, and the fourth syntax element.

Preferably, the coding tree block partitioning unit may partition the current coding tree block into the plurality of coding blocks by using the binary-tree structure or the ternary-tree structure until reaching a valid region in the current coding tree block, and here, the valid region may represent a region which belongs to the boundary of the current picture in the current coding tree block.

Preferably, when the current coding tree block is out of the boundary of the current picture, the coding tree block partitioning unit may parse a fifth syntax element indicating whether quad-tree splitting is allowed, and when the fifth syntax element indicates that the quad-tree splitting is not allowed, the current coding tree block may be partitioned into the plurality of coding blocks by using the binary-tree structure or the ternary-tree structure.

Preferably, the fifth syntax element may be signaled through a Sequence Parameter Set, a Picture Parameter Set, a Tile Group Header, or a header of a Network Abstract Layer unit.

Preferably, the coding tree block partitioning unit may partition the current coding tree block into the plurality of coding blocks by using the quad-tree structure until reaching the valid region in the current coding tree block, and here, the valid region may represent the region which belongs to the boundary of the current picture in the current coding tree block.

Preferably, the coding tree block partitioning unit may partition the current coding tree block into the coding blocks by using the quad-tree structure when a width of the valid region is larger than a maximum transform size or a height of the valid region is larger than the maximum transform size.

According to an embodiment of the present disclosure, a QTBT split structure is effectively determined and related information is signaled to enhance compression performance.

Furthermore, according to an embodiment of the present disclosure, an inefficient split structure is not allowed by considering a ratio of a width and a height to reduce the number of bits required for partitioning information signaling.

Effects obtainable in the present disclosure are not limited to the aforementioned effects and other unmentioned effects will be clearly understood by those skilled in the art from the following description.

DESCRIPTION OF DRAWINGS

In order to help understanding of the present disclosure, the accompanying drawings which are included as a part of the Detailed Description provide embodiments of the present disclosure and describe the technical features of the present disclosure together with the Detailed Description.

DETAILED DESCRIPTION

Figure 1:
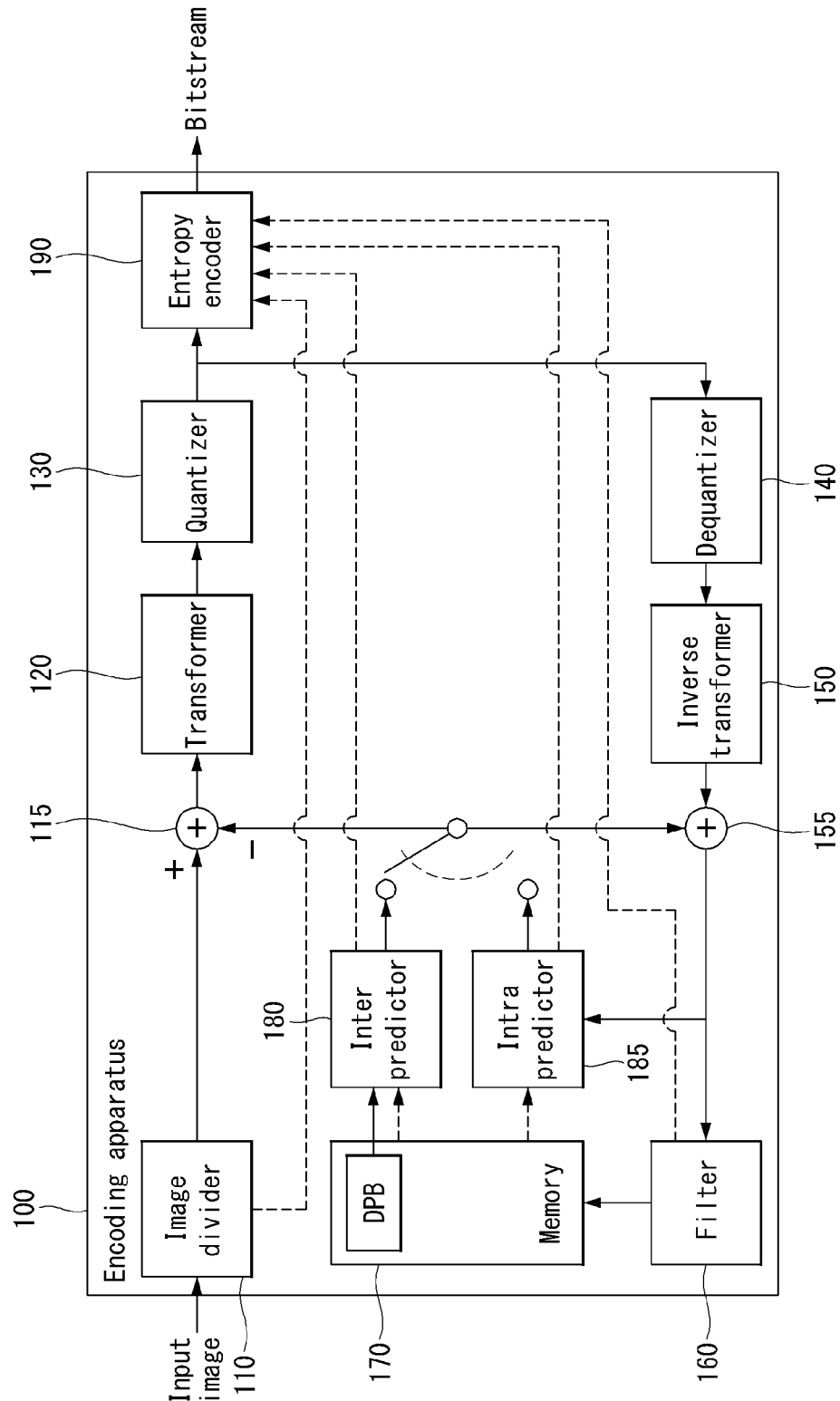
FIG. 1 is a schematic block diagram of an encoding apparatus in which encoding of a video/image signal is performed as an embodiment to which the present disclosure is applied.

Some embodiments of the present disclosure are described in detail with reference to the accompanying drawings. A detailed description to be disclosed along with the accompanying drawings are intended to describe some embodiments of the present disclosure and are not intended to describe a sole embodiment of the present disclosure. The following detailed description includes more details in order to provide full understanding of the present disclosure. However, those skilled in the art will understand that the present disclosure may be implemented without such more details.

In some cases, in order to avoid that the concept of the present disclosure becomes vague, known structures and devices are omitted or may be shown in a block diagram form based on the core functions of each structure and device.

Although most terms used in the present disclosure have been selected from general ones widely used in the art, some terms have been arbitrarily selected by the applicant and their meanings are explained in detail in the following description as needed. Thus, the present disclosure should be understood with the intended meanings of the terms rather than their simple names or meanings.

Specific terms used in the following description have been provided to help understanding of the present disclosure, and the use of such specific terms may be changed in various forms without departing from the technical sprit of the present disclosure. For example, signals, data, samples, pictures, frames, blocks and the like may be appropriately replaced and interpreted in each coding process.

In the present description, a "processing unit" refers to a unit in which an encoding/decoding process such as prediction, transform and/or quantization is performed. Hereinafter, for convenience of description, the processing unit may be referred to as a 'processing block' or a 'block'.

Further, the processing unit may be interpreted into the meaning including a unit for a luma component and a unit for a chroma component. For example, the processing unit may correspond to a coding tree unit (CTU), a coding unit (CU), a prediction unit (PU) or a transform unit (TU).

In addition, the processing unit may be interpreted into a unit for a luma component or a unit for a chroma component. For example, the processing unit may correspond to a coding tree block (CTB), a coding block (CB), a prediction unit PU or a transform block (TB) for the luma component. Further, the processing unit may correspond to a CTB, a CB, a PU or a TB for the chroma component. Moreover, the processing unit is not limited thereto and may be interpreted into the meaning including a unit for the luma component and a unit for the chroma component.

In addition, the processing unit is not necessarily limited to a square block and may be configured as a polygonal shape having three or more vertexes.

Furthermore, in the present description, a pixel is called a sample. In addition, using a sample may mean using a pixel value or the like.

FIG. 1 is a schematic block diagram of an encoding apparatus which encodes a video/image signal as an embodiment to which the present disclosure is applied.

Referring to FIG. 1, an encoding apparatus 100 may be configured to include an image divider 110, a subtractor 115, a transformer 120, a quantizer 130, a dequantizer 140, an inverse transformer 150, an adder 155, a filter 160, a memory 170, an inter predictor 180, an intra predictor 185 and an entropy encoder 190. The inter predictor 180 and the intra predictor 185 may be commonly called a predictor. In other words, the predictor may include the inter predictor 180 and the intra predictor 185. The transformer 120, the quantizer 130, the dequantizer 140, and the inverse transformer 150 may be included in a residual processor. The residual processor may further include the subtractor 115. In one embodiment, the image divider 110, the subtractor 115, the transformer 120, the quantizer 130, the dequantizer 140, the inverse transformer 150, the adder 155, the filter 160, the inter predictor 180, the intra predictor 185 and the entropy encoder 190 may be configured as one hardware component (e.g., an encoder or a processor). Furthermore, the memory 170 may include a decoded picture buffer (DPB), and may be implemented by a digital storage medium.

The image divider 110 may divide an input image (or picture or frame), input to the encoding apparatus 100, into one or more processing units. For example, the processing unit may be called a coding unit (CU). In this case, the coding unit may be recursively split from a coding tree unit (CTU) or the largest coding unit (LCU) based on a quadtree binary-tree (QTBT) structure. For example, one coding unit may be split into a plurality of coding units of a deeper depth based on a quadtree structure and/or a binary-tree structure. In this case, for example, the quadtree structure may be first applied, and the binary-tree structure may be then applied. Alternatively the binary-tree structure may be first applied. A coding procedure according to the disclosure may be performed based on the final coding unit that is no longer split. In this case, the largest coding unit may be directly used as the final coding unit based on coding efficiency according to an image characteristic or a coding unit may be recursively split into coding units of a deeper depth, if necessary. Accordingly, a coding unit having an optimal size may be used as the final coding unit. In this case, the coding procedure may include a procedure, such as a prediction, transform or reconstruction to be described later. For another example, the processing unit may further include a prediction unit (PU) or a transform unit (TU). In this case, each of the prediction unit and the transform unit may be divided or partitioned from each final coding unit. The prediction unit may be a unit for sample prediction, and the transform unit may be a unit from which a transform coefficient is derived and/or a unit in which a residual signal is derived from a transform coefficient.

A unit may be interchangeably used with a block or an area according to circumstances. In a common case, an M×N block may indicate a set of samples configured with M columns and N rows or a set of transform coefficients. In general, a sample may indicate a pixel or a value of a pixel, and may indicate only a pixel/pixel value of a luma component or only a pixel/pixel value of a chroma component. In a sample, one picture (or image) may be used as a term corresponding to a pixel or pel.

The encoding apparatus 100 may generate a residual signal (residual block or residual sample array) by subtracting a prediction signal (predicted block or prediction sample array), output by the inter predictor 180 or the intra predictor 185, from an input image signal (original block or original sample array). The generated residual signal is transmitted to the transformer 120. In this case, as illustrated, a unit in which the prediction signal (prediction block or prediction sample array) is subtracted from the input image signal (original block or original sample array) within the encoding apparatus 100 may be called the subtractor 115. The predictor may perform prediction on a processing target block (hereinafter referred to as a current block), and may generate a predicted block including prediction samples for the current block. The predictor may determine whether an intra prediction is applied or inter prediction is applied in a current block or a CU unit. The predictor may generate various pieces of information on a prediction, such as prediction mode information as will be described later in the description of each prediction mode, and may transmit the information to the entropy encoder 190. The information on prediction may be encoded in the entropy encoder 190 and may be output in a bitstream form.

The intra predictor 185 may predict a current block with reference to samples within a current picture. The referred samples may be located to neighbor the current block or may be spaced from the current block depending on a prediction mode. In an intra prediction, prediction modes may include a plurality of non-angular modes and a plurality of angular modes. The non-angular mode may include a DC mode and a planar mode, for example. The angular mode may include 33 angular prediction modes or 65 angular prediction modes, for example, depending on a fine degree of a prediction direction. In this case, angular prediction modes that are more or less than the 33 angular prediction modes or 65 angular prediction modes may be used depending on a configuration, for example. The intra predictor 185 may determine a prediction mode applied to a current block using the prediction mode applied to a neighboring block.

The inter predictor 180 may derive a predicted block for a current block based on a reference block (reference sample array) specified by a motion vector on a reference picture. In this case, in order to reduce the amount of motion information transmitted in an inter prediction mode, motion information may be predicted as a block, a sub-block or a sample unit based on the correlation of motion information between a neighboring block and the current block. The motion information may include a motion vector and a reference picture index. The motion information may further include inter prediction direction (L0 prediction, L1 prediction, Bi prediction) information. In the case of inter prediction, a neighboring block may include a spatial neighboring block within a current picture and a temporal neighboring block within a reference picture. A reference picture including a reference block and a reference picture including a temporal neighboring block may be the same or different. The temporal neighboring block may be referred to as a name called a co-located reference block or a co-located CU (colCU). A reference picture including a temporal neighboring block may be referred to as a co-located picture (colPic). For example, the inter predictor 180 may construct a motion information candidate list based on neighboring blocks, and may generate information indicating that which candidate is used to derive a motion vector and/or reference picture index of a current block. An inter prediction may be performed based on various prediction modes. For example, in the case of a skip mode and a merge mode, the inter predictor 180 may use motion information of a neighboring block as motion information of a current block. In the case of the skip mode, unlike the merge mode, a residual signal may not be transmitted. In the case of a motion vector prediction (MVP) mode, a motion vector of a neighboring block may be used as a motion vector predictor. A motion vector of a current block may be indicated by signaling a motion vector difference.

A prediction signal generated through the inter predictor 180 or the intra predictor 185 may be used to generate a reconstructed signal or a residual signal.

The transformer 120 may generate transform coefficients by applying a transform scheme to a residual signal. For example, the transform scheme may include at least one of a discrete cosine transform (DCT), a discrete sine transform (DST), a Karhunen-Loève transform (KLT), a graph-based transform (GBT), or a conditionally non-linear transform (CNT). In this case, the GBT means a transform obtained from a graph if relation information between pixels is represented as the graph. The CNT means a transform obtained based on a prediction signal generated u sing all of previously reconstructed pixels. Furthermore, a transform process may be applied to pixel blocks having the same size of a square form or may be applied to blocks having variable sizes not a square form.

The quantizer 130 may quantize transform coefficients and transmit them to the entropy encoder 190. The entropy encoder 190 may encode a quantized signal (information on quantized transform coefficients) and output it in a bitstream form. The information on quantized transform coefficients may be called residual information. The quantizer 130 may re-arrange the quantized transform coefficients of a block form in one-dimensional vector form based on a coefficient scan sequence, and may generate information on the quantized transform coefficients based on the quantized transform coefficients of the one-dimensional vector form. The entropy encoder 190 may perform various encoding methods, such as exponential Golomb, context-adaptive variable length coding (CAVLC), and context-adaptive binary arithmetic coding (CABAC). The entropy encoder 190 may encode information (e.g., values of syntax elements) necessary for video/image reconstruction in addition to the quantized transform coefficients together or separately. The encoded information (e.g., encoded video/image information) may be transmitted or stored in a network abstraction layer (NAL) unit unit in the form of a bitstream. The bitstream may be transmitted over a network or may be stored in a digital storage medium. In this case, the network may include a broadcast network and/or a communication network. The digital storage medium may include various storage media, such as a USB, an SD, a CD, a DVD, Blueray, an HDD, and an SSD. A transmitter (not illustrated) that transmits a signal output by the entropy encoder 190 and/or a storage (not illustrated) for storing the signal may be configured as an internal/external element of the encoding apparatus 100, or the transmitter may be an element of the entropy encoder 190.

Quantized transform coefficients output by the quantizer 130 may be used to generate a prediction signal. For example, a residual signal may be reconstructed by applying de-quantization and an inverse transform to the quantized transform coefficients through the dequantizer 140 and the inverse transformer 150 within a loop. The adder 155 may add the reconstructed residual signal to a prediction signal output by the inter predictor 180 or the intra predictor 185, so a reconstructed signal (reconstructed picture, reconstructed block or reconstructed sample array) may be generated. A predicted block may be used as a reconstructed block if there is no residual for a processing target block as in the case where a skip mode has been applied. The adder 155 may be called a reconstructor or a reconstruction block generator. The generated reconstructed signal may be used for the intra prediction of a next processing target block within a current picture, and may be used for the inter prediction of a next picture through filtering as will be described later.

The filter 160 can improve subjective/objective picture quality by applying filtering to a reconstructed signal. For example, the filter 160 may generate a modified reconstructed picture by applying various filtering methods to the reconstructed picture. The modified reconstructed picture may be stored in the memory 170, more particularly in the DPB of the memory 170. The various filtering methods may include deblocking filtering, a sample adaptive offset, an adaptive loop filter, and a bilateral filter, for example. The filter 160 may generate various pieces of information for filtering as will be described later in the description of each filtering method, and may transmit them to the entropy encoder 190. The filtering information may be encoded by the entropy encoder 190 and output in a bitstream form.

The modified reconstructed picture transmitted to the memory 170 may be used as a reference picture in the inter predictor 180. The encoding apparatus can avoid a prediction mismatch in the encoding apparatus 100 and a decoding apparatus and improve encoding efficiency if inter prediction is applied.

The DPB of the memory 170 may store the modified reconstructed picture to use it as a reference picture in the inter predictor 180. The memory 170 may store motion information of a block in which the motion information in the current picture is derived (or encoded) and/or motion information of blocks in an already reconstructed picture. The stored motion information may be forwarded to the inter predictor 180 to be utilized as motion information of a spatial neighboring block or motion information of a temporal neighboring block. The memory 170 may store reconstructed samples of the reconstructed blocks in the current picture and forward it to the intra predictor 185.

Figure 2:
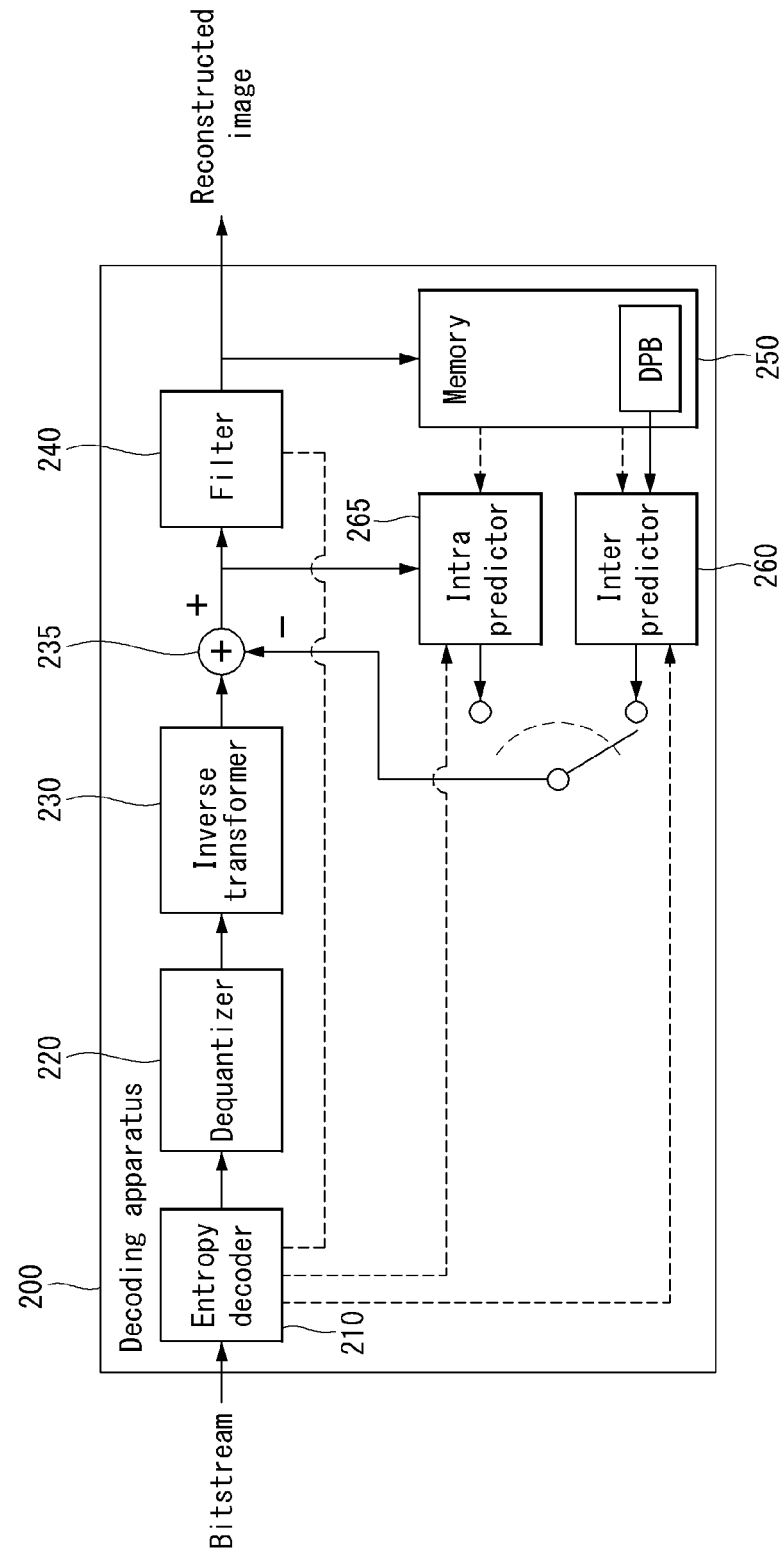
FIG. 2 is a schematic block diagram of a decoding apparatus in which decoding of a video/image signal is performed as an embodiment to which the present disclosure is applied.

FIG. 2 is an embodiment to which the disclosure is applied, and is a schematic block diagram of a decoding apparatus for decoding a video/image signal.

Referring to FIG. 2, the decoding apparatus 200 may be configured to include an entropy decoder 210, a dequantizer 220, an inverse transformer 230, an adder 235, a filter 240, a memory 250, an inter predictor 260 and an intra predictor 265. The inter predictor 260 and the intra predictor 265 may be collectively called a predictor. That is, the predictor may include the inter predictor 180 and the intra predictor 185. The dequantizer 220 and the inverse transformer 230 may be collectively called as residual processor. That is, the residual processor may include the dequantizer 220 and the inverse transformer 230. The entropy decoder 210, the dequantizer 220, the inverse transformer 230, the adder 235, the filter 240, the inter predictor 260 and the intra predictor 265 may be configured as one hardware component (e.g., the decoder or the processor) according to an embodiment. Furthermore, the memory 250 may include a decoded picture buffer (DPB), and may be implemented by a digital storage medium.

When a bitstream including video/image information is input, the decoding apparatus 200 may reconstruct an image in accordance with a process of processing video/image information in the encoding apparatus of FIG. 1. For example, the decoding apparatus 200 may perform decoding using a processing unit applied in the encoding apparatus. Accordingly, a processing unit for decoding may be a coding unit, for example. The coding unit may be split from a coding tree unit or the largest coding unit depending on a quadtree structure and/or a binary-tree structure. Furthermore, a reconstructed image signal decoded and output through the decoding apparatus 200 may be played back through a playback device.

The decoding apparatus 200 may receive a signal, output by the encoding apparatus of FIG. 1, in a bitstream form. The received signal may be decoded through the entropy decoder 210. For example, the entropy decoder 210 may derive information (e.g., video/image information) for image reconstruction (or picture reconstruction) by parsing the bitstream. For example, the entropy decoder 210 may decode information within the bitstream based on a coding method, such as exponential Golomb encoding, CAVLC or CABAC, and may output a value of a syntax element for image reconstruction or quantized values of transform coefficients regarding a residual. More specifically, in the CABAC entropy decoding method, a bin corresponding to each syntax element may be received from a bitstream, a context model may be determined using decoding target syntax element information and decoding information of a neighboring and decoding target block or information of a symbol/bin decoded in a previous step, a probability that a bin occurs may be predicted based on the determined context model, and a symbol corresponding to a value of each syntax element may be generated by performing arithmetic decoding on the bin. In this case, in the CABAC entropy decoding method, after a context model is determined, the context model may be updated using information of a symbol/bin decoded for the context model of a next symbol/bin. Information on a prediction among information decoded in the entropy decoder 2110 may be provided to the predictor (inter predictor 260 and intra predictor 265). Parameter information related to a residual value on which entropy decoding has been performed in the entropy decoder 210, that is, quantized transform coefficients, may be input to the dequantizer 220. Furthermore, information on filtering among information decoded in the entropy decoder 210 may be provided to the filter 240. Meanwhile, a receiver (not illustrated) that receives a signal output by the encoding apparatus may be further configured as an internal/external element of the decoding apparatus 200 or the receiver may be an element of the entropy decoder 210.

The dequantizer 220 may de-quantize quantized transform coefficients and output transform coefficients. The dequantizer 220 may re-arrange the quantized transform coefficients in a two-dimensional block form. In this case, the re-arrangement may be performed based on a coefficient scan sequence performed in the encoding apparatus. The dequantizer 220 may perform de-quantization on the quantized transform coefficients using a quantization parameter (e.g., quantization step size information), and may obtain transform coefficients.

The inverse transformer 230 may output a residual signal (residual block or residual sample array) by applying inverse-transform to transform coefficients.

The predictor may perform a prediction on a current block, and may generate a predicted block including prediction samples for the current block. The predictor may determine whether an intra prediction is applied or inter prediction is applied to the current block based on information on a prediction, which is output by the entropy decoder 210, and may determine a detailed intra/inter prediction mode.

The intra predictor 265 may predict a current block with reference to samples within a current picture. The referred samples may be located to neighbor a current block or may be spaced apart from a current block depending on a prediction mode. In an intra prediction, prediction modes may include a plurality of non-angular modes and a plurality of angular modes. The intra predictor 265 may determine a prediction mode applied to a current block using a prediction mode applied to a neighboring block.

The inter predictor 260 may derive a predicted block for a current block based on a reference block (reference sample array) specified by a motion vector on a reference picture. In this case, in order to reduce the amount of motion information transmitted in an inter prediction mode, motion information may be predicted as a block, a sub-block or a sample unit based on the correlation of motion information between a neighboring block and the current block. The motion information may include a motion vector and a reference picture index. The motion information may further include inter prediction direction (L0 prediction, L1 prediction, Bi prediction) information. In the case of inter prediction, a neighboring block may include a spatial neighboring block within a current picture and a temporal neighboring block within a reference picture. For example, the inter predictor 260 may configure a motion information candidate list based on neighboring blocks, and may derive a motion vector and/or reference picture index of a current block based on received candidate selection information. An inter prediction may be performed based on various prediction modes. Information on the prediction may include information indicating a mode of inter prediction for a current block.

The adder 235 may generate a reconstructed signal (reconstructed picture, reconstructed block or reconstructed sample array) by adding an obtained residual signal to a prediction signal (predicted block or prediction sample array) output by the inter predictor 260 or the intra predictor 265. A predicted block may be used as a reconstructed block if there is no residual for a processing target block as in the case where a skip mode has been applied.

The adder 235 may be called a reconstructor or a reconstruction block generator. The generated reconstructed signal may be used for the intra prediction of a next processing target block within a current picture, and may be used for the inter prediction of a next picture through filtering as will be described later.

The filter 240 can improve subjective/objective picture quality by applying filtering to a reconstructed signal. For example, the filter 240 may generate a modified reconstructed picture by applying various filtering methods to a reconstructed picture, and may transmit the modified reconstructed picture to the memory 250, more particularly to the DPB of the memory 250. The various filtering methods may include deblocking filtering, a sample adaptive offset SAO, an adaptive loop filter ALF, and a bilateral filter, for example.

The (modified) reconstructed picture stored in the DPB of the memory 250 may be used as a reference picture in the inter predictor 260. The memory 250 may store motion information of a block in which the motion information in the current picture is derived (or decoded) and/or motion information of blocks in an already reconstructed picture. The stored motion information may be forwarded to the inter predictor 260 to be utilized as motion information of a spatial neighboring block or motion information of a temporal neighboring block. The memory 170 may store reconstructed samples of the reconstructed blocks in the current picture and forward it to the intra predictor 265.

In the disclosure, the embodiments described in the filter 160, inter predictor 180 and intra predictor 185 of the encoding apparatus 100 may be applied to the filter 240, inter predictor 260 and intra predictor 265 of the decoding apparatus 200, respectively, identically or in a correspondence manner.

Block Partitioning

The video/image coding method according to the present disclosure may be performed based on various detailed techniques, and each of the various detailed techniques is described as below. It is apparent to those skilled in the art that the techniques described herein may be associated with the related procedure such as a prediction, a residual process ((inverse) transform, (de)quantization, etc.), a syntax element coding, a filtering, a partitioning/splitting in a video/image encoding/decoding procedure described above and/or described below.

The block partitioning procedure according to the present disclosure may be performed in the image divider 110 of the encoding apparatus described above, and the partitioning related information may be (encoding) processed in the entropy encoder 190 and forwarded to the decoding apparatus in a bitstream format. The entropy decoder 210 of the decoding apparatus may obtain a block partitioning structure of a current picture based on the partitioning related information obtained from the bitstream, and based on it, may perform a series of procedure (e.g., prediction, residual processing, block reconstruction, in-loop filtering, etc.) for an image decoding.

Partitioning of Picture into CTUs

Pictures may be divided into a sequence of coding tree units (CTUs). A CTU may correspond to a coding tree block (CTB). Alternatively, a CTU may include a coding tree block of luma samples and two coding tree blocks of corresponding chroma samples. In other words, for a picture including three types of sample arrays, a CTU may include an N×N block of luma samples and two corresponding samples of chroma samples.

A maximum supported size of a CTU for coding and prediction may be different from a maximum supported size of a CTU for transform. For example, a maximum supported size of luma block in a CTU may be 128×128.

Partitioning of the CTUs Using a Tree Structure

A CTU may be divided into CUs based on a quad-tree (QT) structure. The quad-tree structure may be called as a quaternary structure. This is for reflecting various local characteristics. Meanwhile, in the present disclosure, a CTU may be divided based on a multi-type tree structure partitioning including a binary-tree (BT) and a ternary-tree (TT) as well as the quad-tree. Hereinafter, QTBT structure may include the quad-tree and binary-tree structures, and QTBTTT may include partitioning structures based on the binary-tree and ternary-tree. Alternatively, the QTBT structure may also include partitioning structures based on the quad-tree, binary-tree and ternary-tree. In the coding tree structure, a CU may have a square or rectangle shape. A CTU may be divided into a quad-tree structure, first. And then, leaf nodes of the quad-tree structure may be additionally divided by the multi-type tree structure.

Figure 3:
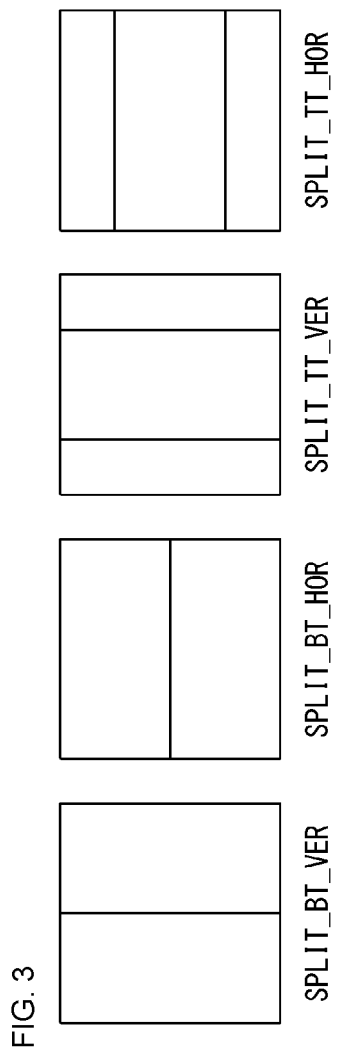
FIG. 3 is a diagram illustrating an example of a multi-type tree structure to which the present disclosure may be applied.

FIG. 3 is a diagram illustrating an example of a multi-type tree structure as an embodiment to which the present disclosure may be applied.

In an embodiment of the present disclosure, a multi-type tree structure may include 4 split types as shown in FIG. 3. The 4 split types may include a vertical binary splitting (SPLIT_BT_VER), a horizontal binary splitting (SPLIT_BT_HOR), a vertical ternary splitting (SPLIT_TT_VER) and a horizontal ternary splitting (SPLIT_TT_HOR). The leaf nodes of the multi-type tree structure may be called as CUs. Such CUs may be used for prediction and transform procedure. In the present disclosure, generally, a CU, a PU and a TU may have the same block size. However, in the case that a maximum supported transform length is smaller than a width or a height of a color component, a CU and a TU may have different block sizes.

Figure 4:
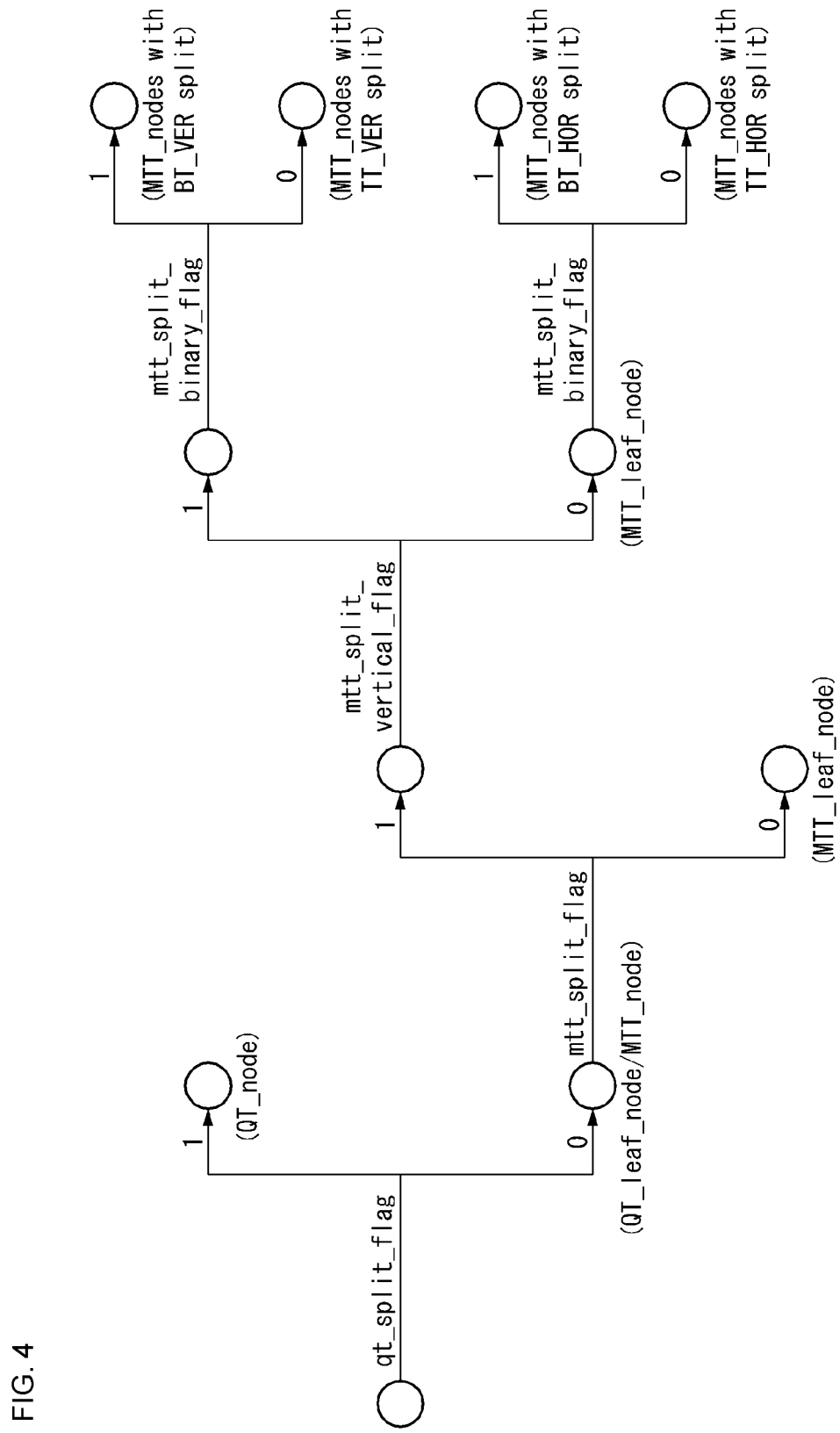
FIG. 4 is a diagram illustrating a signaling mechanism of partitioning information of a quadtree with nested multi-type tree structure as an embodiment to which the present disclosure may be applied.

FIG. 4 is a diagram illustrating a signaling mechanism of partition split information of a quadtree with nested multi-type tree structure as an embodiment to which the present disclosure may be applied.

Here, a CTU may be treated as a root of a quad-tree and initially partitioned into a quad-tree structure. Each quad-tree leaf node may be further partitioned into a multi-type tree structure later. In the multi-type tree structure, a first flag (e.g., mtt_split_cu_flag) is signaled to indicate whether the corresponding node is further partitioned). In the case that the corresponding node is further partitioned, a second flag (e.g., mtt_split_cu_verticla_flag) may be signaled to indicate a splitting direction. Later, a third flag (e.g., mtt_split_cu_binary_flag) may be signaled to indicate whether the split type is a binary split or a ternary split. For example, based on the mtt_split_cu_vertical_flag and the mtt_split_cu_binary_flag, a multi-type tree splitting mode (MttSplitMode) may be derived as represented in Table 1 below.

MaxMttDepth: the maximum allowed hierarchy depth of multi-type tree splitting from a quadtree leaf MinBtSize: the minimum allowed binary tree leaf node size MinTtSize: the minimum allowed ternary tree leaf node size As an example of the quad-tree coding tree scheme with nested multi-type tree, a CTU size may be set to 128×128 luma samples and 64×64 blocks of two corresponding chroma samples (in 4:2:0 chroma sample). In this case, MinOTSize may be set to 16×16, MaxBtSize may be set to 128×128, MaxTtSzie may be set to 64×64, MinBtSize and MinTtSize (for both width and height) may be set to 4×4, and MaxMttDepth may be set to 4. The quad-tree partitioning may be applied to a CTU and generate quad-tree leaf nodes. The quad-tree leaf node may be called a leaf QT node. The quad-tree leaf nodes may have a size from 16×16 size (i.e. the MinOTSize) to 128×128 size (i.e. the CTU size). In the case that a leaf QT node is 128×128, the leaf QT node may not be partitioned into a binary-tree/ternary-tree. This is because the leaf QT node exceeds MaxBtsize and MaxTtszie (i.e., 64×64) even in the case the leaf QT node is partitioned. In other case, the leaf QT node may be addi-

TABLE 1

| MttSplitMode | mtt_split_cu_vertical_flag | mtt_split_cu_binary_flag |
| --- | --- | --- |
| SPLIT_TT_HOR | 0 | 0 |
| SPLIT_BT_HOR | 0 | 1 |
| SPLIT_TT_VER | 1 | 0 |
| SPLIT_BT_VER | 1 | 1 |

Figure 5:
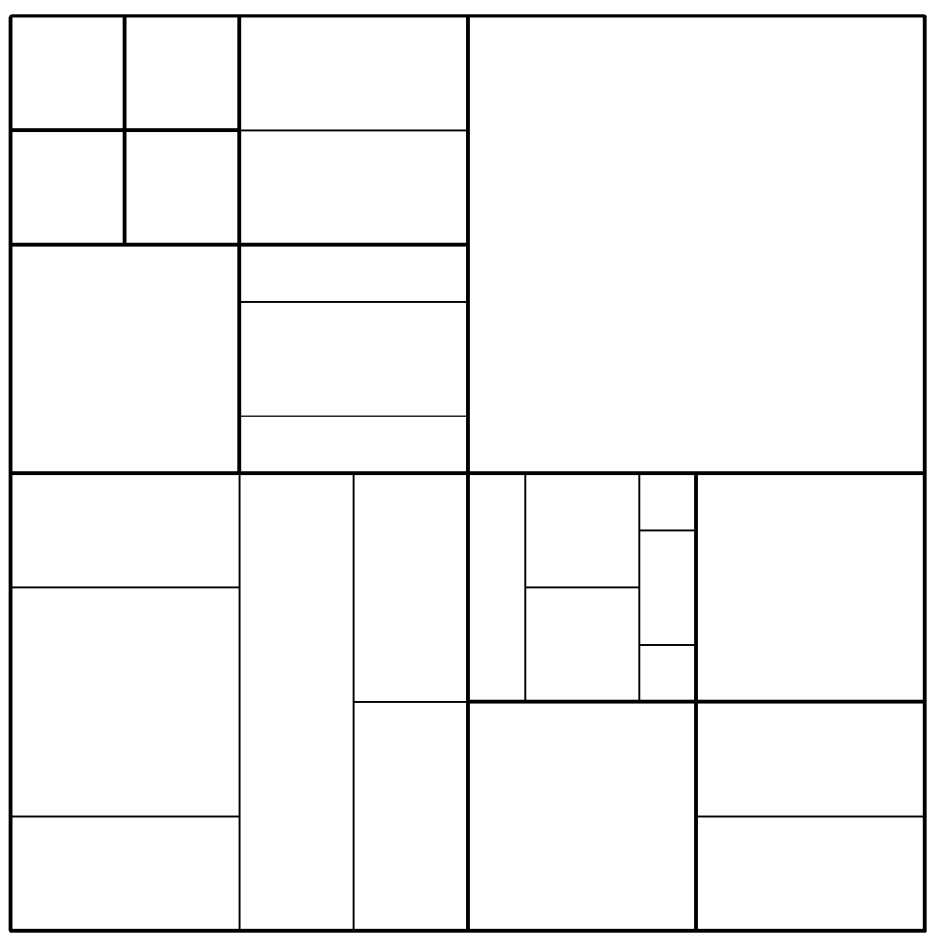
FIG. 5 is a diagram illustrating a method for splitting a CTU into multiple CUs based on a quadtree and nested multi-type tree structure as an embodiment to which the present disclosure may be applied.

FIG. 5 is a diagram illustrating a method of partitioning a CTU into multiple CUs based on a quadtree and nested multi-type tree structure as an embodiment to which the present disclosure may be applied.

Here, bolded block edges represent a quad-tree partitioning, and the remaining edges represent a multi-type tree partitioning. The quad-tree partition with nested multi-type tree may provide a contents-adapted coding tree structure. A CU may correspond to a coding block (CB). Or, a CU may include a coding block of luma samples and two coding blocks of corresponding chroma samples. A size of CU may be great as much as a CTU or may be small as 4×4 in a luma sample unit. For example, in the case of 4:2:0 color format (or chroma format), a maximum chroma CB size may be 64×64, and a minimum chroma CB size may be 2×2.

In the present disclosure, for example, a maximum supported luma TB size may be 64×64, and a maximum supported chroma TB size may be 32×32. In the case that a width or a height of a CB partitioned according to the tree structure is greater than a maximum transform width or height, the CB may be further partitioned until a TB size limit in horizontal and vertical directions are satisfied automatically (or implicitly).

Meanwhile, for the quad-tree coding tree scheme with nested multi-type free, the following parameters may be defined or recognized as SPS syntax element.

CTU size: the root node size of a quaternary tree

MinQTSize: the minimum allowed quaternary tree leaf node size

MaxBtSize: the maximum allowed binary tree root node size

MaxTtSize: the maximum allowed ternary tree root node size tionally partitioned into a multi-type tree. Therefore, the leaf QT node may be a root node for the multi-type tree, and the leaf QT node may have multi-type tree depth (mttDepth) 0 value. In the case that the multi-type tree depth reaches MaxMttdepth (e.g., 4), no more additional partition may be considered. In the case that a width of the multi-type tree node is equal to MinBtSize and smaller than or equal to 2×MinTtSize, no more additional horizontal partitioning may be considered. In the case that a height of the multi-type tree node is equal to MinBtSize and smaller than or equal to 2×MinTtSize, no more additional vertical partitioning may be considered.

Figure 6:
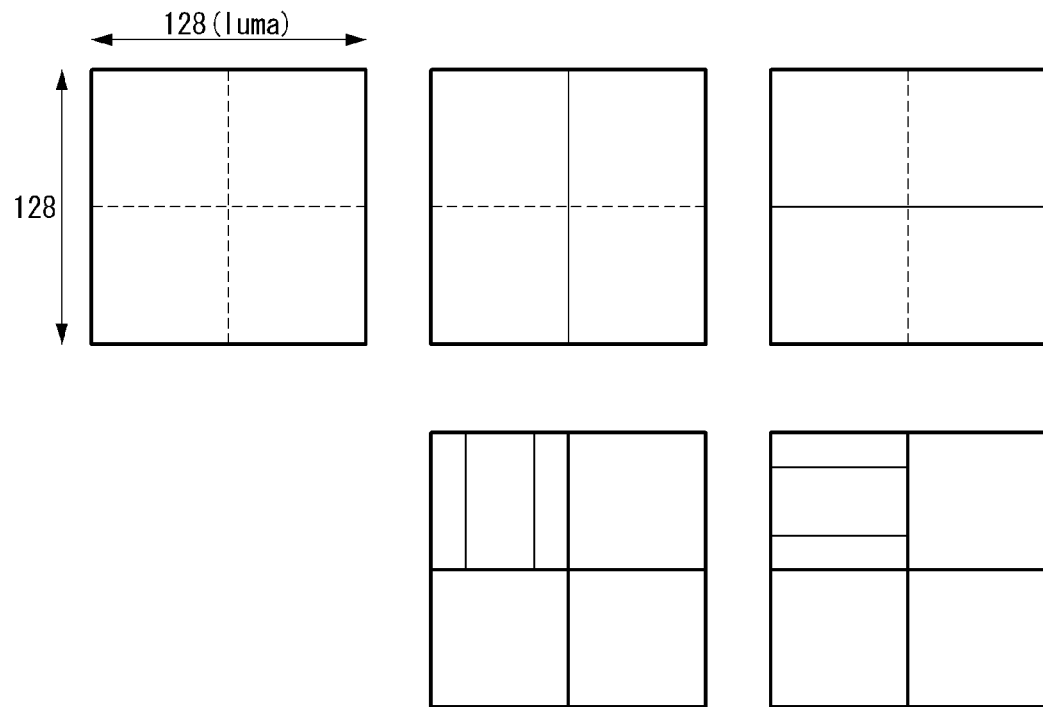
FIG. 6 is a diagram illustrating a method for limiting ternary-tree splitting as an embodiment to which the present disclosure may be applied.

FIG. 6 is a diagram illustrating a method for limiting a ternary-tree split as an embodiment to which the present disclosure may be applied.

Referring to FIG. 6, in order to support 64×64 luma block and 32×32 chroma pipeline design in a hardware decoder, a TT split may be limited in a specific case. For example, in the case that a width or a height of a luma coding block is greater than a predetermined specific value (e.g., 32, 64), as shown in FIG. 6, a TT split may be limited.

In the present disclosure, the coding tree scheme may support that a luma and chroma block have a separate block tree structure. With respect to P and B slices, luma and chroma CTBs in a single CTU may be limited to have the same coding tree structure. However, with respect to I slices, luma and chroma blocks may have respective individual block tree structures. In the case that the individual block tree mode is applied, a luma CTB may be partitioned into CUs based on a specific coding tree structure, and a chroma CTB may be partitioned into chroma CUs based on a different coding tree structure. This may mean that a CU in I slice may include a coding block of chroma component or coding blocks of two chroma component, and a CU in P or B slice may include blocks of three color components.

In the "Partitioning of the CTUs using a tree structure" described above, the quad-tree coding tree scheme with nested multi-type tree is described, but a structure in which a CU is partitioned is not limited thereto. For example, BT structure and TT structure may be interpreted as the concept included in the Multiple Partitioning Tree (MPT) structure, and it may be interpreted that a CU is partitioned through QT structure and MPT structure. In an example that a CU is partitioned through QT structure and MPT structure, a syntax element including information on the number of blocks to which a leaf node of QT structure is partitioned (e.g., MPT_split_type) and a syntax element including information a direction to which a leaf node of QT structure is partitioned between vertical and horizontal directions (e.g., MPT_split_mode) may be signaled, and a split structure may be determined.

In another example, a CU may be partitioned in a method different from QT structure, BT structure or TT structure. That is, different from that a CU of a lower layer depth is partitioned to ¼ size of a CU of a higher layer depth according to QT structure, a CU of a lower layer depth is partitioned to ½ size of a CU of a higher layer depth according to BT structure, or a CU of a lower layer depth is partitioned to ¼ size or ½ size of a CU of a higher layer depth according to TT structure, a CU of a lower layer depth may be partitioned into ⅕, ⅓, ⅜, ⅗, ⅔ or ⅝ size of a CU of a higher layer depth in some cases, but a method of partitioning a CU is not limited thereto.

In the case that a portion of a tree node block exceeds a bottom or right picture boundary, the corresponding tree node block may be limited that all samples of all coded CUs are located within the picture boundaries. In this case, for example, the following split rules may be applied.

If a portion of a tree node block exceeds both the bottom and the right picture boundaries,
If the block is a QT node and the size of the block is larger than the minimum QT size, the block is forced to be split with QT split mode.
Otherwise, the block is forced to be split with SPLIT_BT_HOR mode
Otherwise if a portion of a tree node block exceeds the bottom picture boundaries,
If the block is a QT node, and the size of the block is larger than the minimum QT size, and the size of the block is larger than the maximum BT size, the block is forced to be split with QT split mode.
Otherwise, if the block is a QT node, and the size of the block is larger than the minimum QT size and the size of the block is smaller than or equal to the maximum BT size, the block is forced to be split with QT split mode or SPLIT_BT_HOR mode.
Otherwise (the block is a BTT node or the size of the block is smaller than or equal to the minimum QT size), the block is forced to be split with SPLIT_BT_HOR mode.
Otherwise if a portion of a tree node block exceeds the right picture boundaries,
If the block is a QT node, and the size of the block is larger than the minimum QT size and the size of the block is larger than the maximum BT size, the block is forced to be split with QT split mode.
Otherwise, if the block is a QT node, and the size of the block is larger than the minimum QT size and the size of the block is smaller than or equal to the maximum BT size, the block is forced to be split with QT split mode or SPLIT_BT_VER mode.
Otherwise (the block is a BTT node or the size of the block is smaller than or equal to the minimum QT size), the block is forced to be split with SPLIT_BT_VER mode.

Embodiment 1

Figure 7:
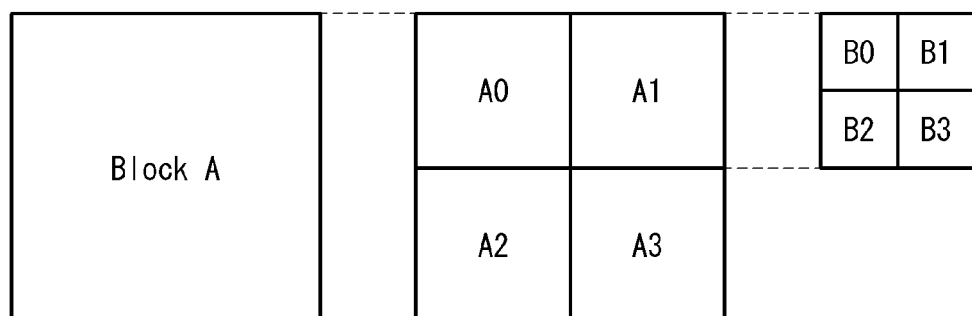
FIG. 7 is a diagram illustrating a quad-tree based block partitioning structure as an embodiment to which the present disclosure is applied.

FIG. 7 is a diagram illustrating a quad-tree based block partitioning structure as an embodiment to which the present disclosure is applied.

Referring to FIG. 7, in an embodiment of the present disclosure, one block may be partitioned based on a quad-tree (QT). In addition, one subblock partitioned into a QT structure may be further divided recursively partitioned into the QT structure. A terminal block (may be referred to as a leaf block or a leaf node block) which is not partitioned into the QT structure any longer may be partitioned by at least one of a binary tree (BT), a ternary tree (TT), or an asymmetric tree (AT).

As an example, the block A may be partitioned into four subblocks A0, A1, A2, and A3 in the QT structure. In addition, the subblock A1 may be partitioned into four subblocks B0, B1, B2, and B3 in the QT structure again.

Figure 8:
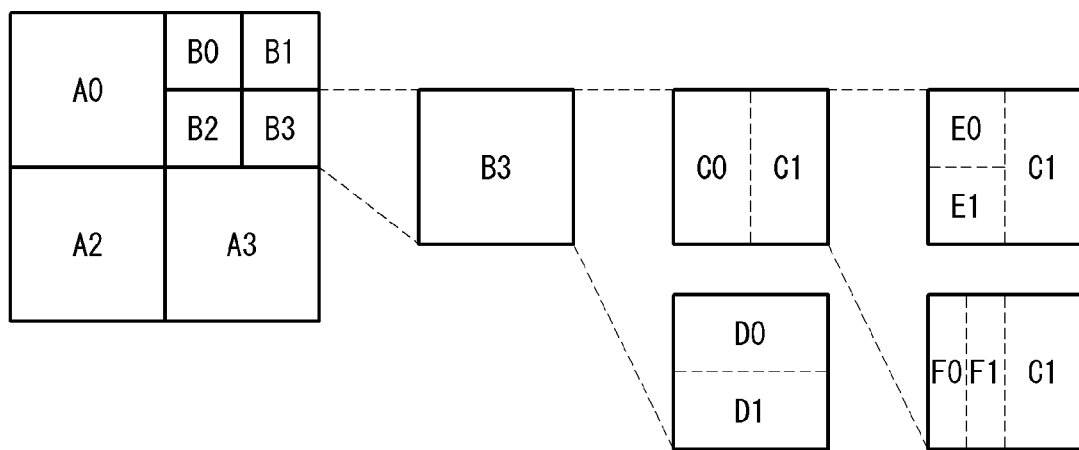
FIG. 8 is a diagram illustrating a binary-tree based block partitioning structure as an embodiment to which the present disclosure is applied.

FIG. 8 is a diagram illustrating a binary-tree based block partitioning structure as an embodiment to which the present disclosure is applied.

Referring to FIG. 8, the BT may have two types of partitions: horizontal BT (e.g., 2N×N or 2N×N) and vertical BT (e.g., N×2N or N×2N).

As an example, the block (i.e., leaf node block) B3 which is not partitioned into the QT structure any longer may be partitioned into vertical BT (C0, C1) or horizontal BT (D0, D1). When the block is vertically partitioned, like the block C0, each subblock may be recursively partitioned like a form of horizontal BT (E0, E1) or vertical BT (F0, F1).

Figure 9:
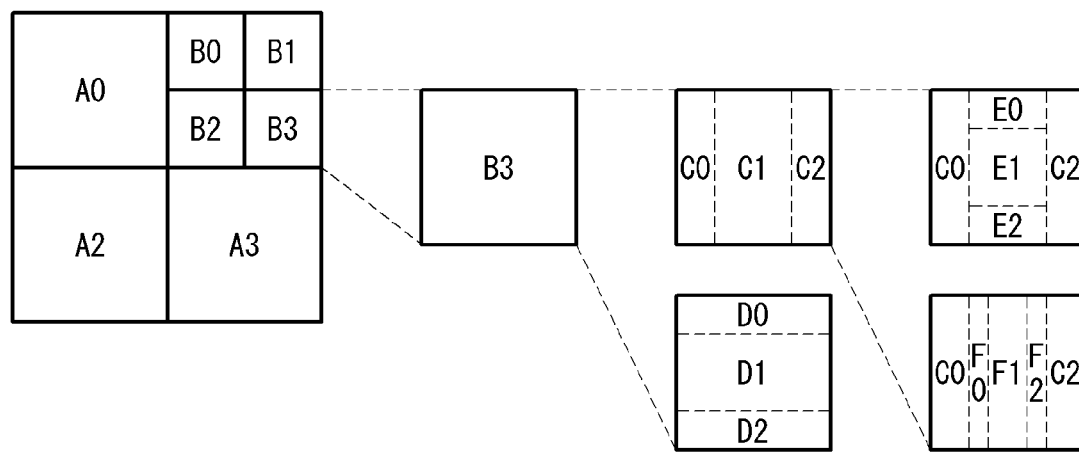
FIG. 9 is a diagram illustrating a ternary-tree based block partitioning structure as an embodiment to which the present disclosure is applied.

FIG. 9 is a diagram illustrating a ternary-tree based block partitioning structure as an embodiment to which the present disclosure is applied.

Referring to FIG. 9, the TT may have two types of partitions: horizontal TT (e.g., 2N×1/2N, 2N×N, or 2N×1/2N) and vertical TT (e.g., 1/2N×2N, N×2N, or 1/2N×2N).

As an example, the block B3 which is not partitioned into the QT any longer may be partitioned into vertical TT (C0, C1, or C2) or horizontal TT (D0, D1, or D2). As illustrated in FIG. 9, the block C1 may be recursively partitioned like a form of horizontal TT (E0, E1, or E2) or vertical TT (F0, F1, or F2).

As another example, the AT may have four types of partitioning structures: horizontal-up AT (2N×1/2N, 2N×3/2N), horizontal-down AT (2N×3/2N, 2N×1/2N), vertical-left AT (1/2N×2N, 3/2N×2N), vertical-right AT (3/2N×2N, 1/2N×2N). The BT, the TT, and the AT may be further partitioned recursively by using the BT, the TT, and the AT, respectively.

Figure 10:
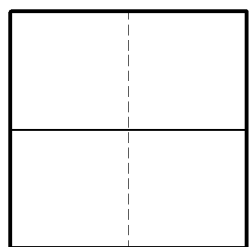
FIG. 10 is a diagram illustrating binary-tree, ternary-tree, and stripe tree based block partitioning structure as an embodiment to which the present disclosure is applied.
Figure 10:
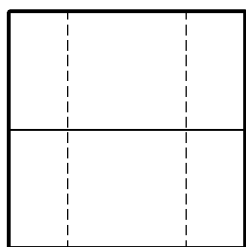
Figure 10:
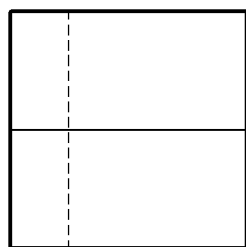
Figure 10:
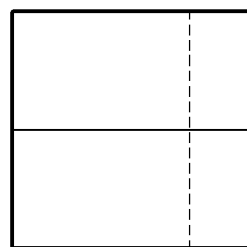
Figure 10:
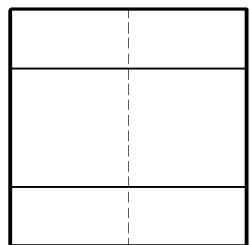
Figure 10:
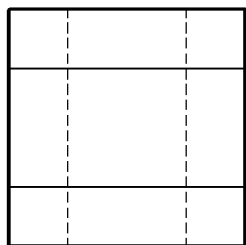
Figure 10:
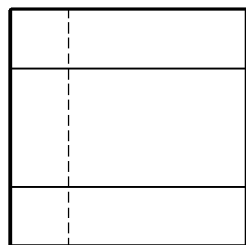
Figure 10:
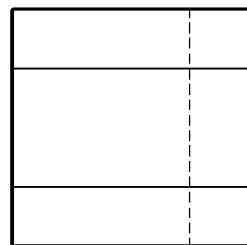
Figure 10:
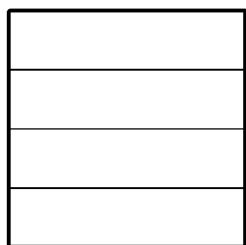
Figure 10:
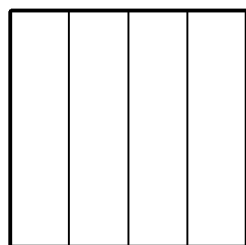

FIG. 10 is a diagram illustrating binary-tree, ternary-tree, and stripe tree based block partitioning structure as an embodiment to which the present disclosure is applied.

Referring to FIG. 10, a processing block may be partitioned by using BT, TT, and stripe tree (ST) partitioning structures together. For example, the subblock partitioned into the BT structure may be partitioned into the TT structure. Alternatively, the subblock partitioned into the TT structure may be partitioned into the BT structure.

Further, in an embodiment, the processing block may be partitioned into an ST structure which is partitioned into four in a horizontal or vertical direction. Further, the BT, TT, and ST partitioning may be used together to partition a block. For example, the subblock partitioned by the BT may be partitioned by the TT or ST. Further, the subblock partitioned by the TT may be partitioned by the BT or ST. Further, the subblock partitioned by the ST may be partitioned by the BT or TT.

In FIG. 10, a split denoted by a thin solid line represents a first split, and split denoted by a thick dotted line represents a second split performed in a sub-block which is generated in the first split.

Table 2 represents coding quadtree syntax structure, and Table 3 represents a syntax for a coding tree.

TABLE 2

| | Descriptor |
|---|---|
| coding_quadtree( x0, y0, log2CbSize, cqtDepth ) { | |
| if ( x0 + ( 1 << log2CbSize ) <= | |
| pic_width_in_luma_samples && y0 + ( 1 << | |
| log2CbSize ) <= pic_height_in_luma_samples && | |
| log2CbSize > MinCbLog2SizeY ) | |
| split_qt_flag[ x0 ][ y0 ] | ae(v) |
| if ( split_cu_flag[ x0 ][ y0 ] ) { | |
| x1 = x0 + ( 1 << ( log2CbSize − 1 ) ) | |
| y1 = y0 + ( 1 << ( log2CbSize − 1 ) ) | |
| coding_quadtree( x0, y0, log2CbSize −1, cqtDepth+1 ) | |
| coding_quadtree( x1, y0, log2CbSize − 1, cqtDepth + 1 ) | |
| coding_quadtree( x1, y0, log2CbSize − 1, cqtDepth + 1 ) | |
| coding_quadtree( x1, y0, log2CbSize − 1, cqtDepth + 1 ) | |
| } else { | |
| coding tree( x0, y0, log2CbSize, log2CbSize) | |
| } | |
| } | |

Referring to Table 2, a decoding process for determining a quad-tree split structure is described. A coding quadtree syntax (or function) may be called with a top left coordinate (x0, y0) of a current block, a size (log 2CbSize) of the current block and a depth of a current quadtree split as inputs.

In the case that a current block does not exceed a width or a height of a current picture, and the current block is greater than a coding block of a minimum size, a decoder parses split_qt_flag syntax element. The split_qt_flag syntax element indicates whether the current block is split into four blocks in the quad-tree structure. For example, in the case that split_qt_flag value is 0, the case represents that the current block is not split into four blocks in the quad-tree structure, and in the case that split_qt_flag value is 1, the case represents that the current block is split into four blocks of a half of the width and a half of the height. x0 and y0 represents a top left position of a luma image.

As a result of parsing, in the case of being determined that the current block is split in the quad-tree structure, a decoder calls coding quadtree syntax (or function) again for 4 sub-blocks split from the current block.

As a result of parsing, in the case of not being determined that the current block is split in the quad-tree structure, a decoder calls coding quadtree syntax (or function) for the current block for determining a subsequent split structure (i.e., multi-type tree structure).

TABLE 3

| | Descriptor |
|---|---|
| coding_tree( x0, y0, log2CbSizeW, log2CbSizeH) { | |
| if ( x0 + ( 1 << log2CbSize ) <= | |

TABLE 3-continued

| | Descriptor |
|---|---|
| pic_width_in_luma_samples && y0 + ( 1 << | |
| log2CbSize ) <= pic_height_in_luma_samples && | |
| log2CbSize > MinBTTCbLog2SizeY ) | |
| split_fur_flag[ x0 ] [ y0 ] | ae(v) |
| if ( split_fur_flag[ x0 ][ y0 ] ) { | |
| split_bt_flag[ x0 ][ y0 ] | ae(v) |
| split_dir[ x0 ][ y0 ] | ae(v) |
| } | |
| if( SplitMode == PART_BT_HOR) { | |
| coding_tree ( x0, y0, log2CbSizeW, log2CbSizeH − 1 ) | |
| coding_tree ( x0, y0 + (1 << ( log2CbSizeH − 1 )), | |
| log2CbSizeW, log2CbSizeH − 1) | |
| } else if ( SplitMode = PART_BT_VER) { | |
| coding_tree ( x0, y0, log2CbSizeW − 1, log2CbSizeH) | |
| coding_tree ( x0 + (1 << ( log2CbSizeW − 1 )), y0, | |
| log2CbSizeW − 1, log2CbSizeH) | |
| } else if ( SplitMode = PART_TT_HOR) { | |
| coding_tree ( x0, y0, log2CbSizeW, log2CbSizeH − 2 ) | |
| coding_tree ( x0, y0 + (1 << ( log2CbSizeH − 2 )), | |
| log2CbSizeW, log2CbSizeH − 1) | |
| coding_tree ( x0, y0 + (1 << ( log2CbSizeH − 2 ) + (1 << | |
| ( log2CbSizeH − 1 )), log2CbSizeW, log2CbSizeH − 2) | |
| } else if ( SplitMode == PART_TT_VER) { | |
| coding_tree ( x0, y0, log2CbSizeW − 2, log2CbSizeH) | |
| coding_tree ( x0 + (1 << ( log2CbSizeW − 2 )), y0, | |
| log2CbSizeW − 1, log2CbSizeH) | |
| coding_tree ( x0 + (1 << ( log2CbSizeW − 2 ) + (1 << | |
| ( log2CbSizeW − 1 )), y0, log2CbSizeW − 2, log2CbSizeH) | |
| } | |
| } else { | |
| coding_unit(x0, y0, log2CbSizeW, log2CbSizeH) | |
| } | |
| } | |

Referring to Table 3, a decoding process for determining an additional split structure in a quad-tree leaf node block is described. A coding quadtree syntax (or function) may be called with a top left coordinate (x0, y0) of a current block, a width (log 2CbSize) of the current block and a width (log 2CbSizeH) of the current block as an input.

In the case that a current block does not exceed a width or a height of a current picture, and the current block is greater than an MTT block of a minimum size, a decoder parses split_fur_flag syntax element. The split_fur_flag syntax element indicates whether the current block is further split. For example, in the case that split_fur_flag value is 0, the case represents that the current block is no more split, and in the case that split_fur_flag value is 1, the case represents that the current block is split.

As a result of parsing, in the case of being determined that the current block is further split, a decoder calls split_bt_flag and split_dir syntax element (or function). The split_bt_flag syntax represents whether the current block is split in the BT structure or the TT structure. For example, in the case that the split_bt_flag value is 1, the case represents that the block is split in the BT, and in the case that the split_bt_flag value is 0, the case represents that the block is split in TT.

A split type (SplitType) of the current block may be determined as represented in Table 4 below based on the split_fur_flag syntax and the split_bt_flag syntax.

TABLE 4

| split_fur_flag | split_bt_flag | SplitType |
|---|---|---|
| 0 | | NO_SPLIT |
| 1 | 1 | BT |
| 1 | 0 | TT |

In addition, in Table 3, the split_dir syntax element represents a split direction. For example, in the case that the split_dir value is 0, the case represents that a block is split in a horizontal direction, and in the case that the split_dir value is 1, the case represents that a block is split in a vertical direction.

The final block split mode (SplitMode) which is MTT split from a current block may be induced as represented in Table 5 below.

TABLE 5

| SplitType | split_dir | SplitMode |
|---|---|---|
| BT | 0 | PART_BT_HOR |
|  | 1 | PART_BT_VER |
| TT | 0 | PART_TT_HOR |
|  | 1 | PART_TT_VER |

A decoder calls the coding tree syntax (or function) again for the sub-block split according to the finally determined split structure.

Embodiment 2

In an embodiment of the present disclosure, proposed is a method for allowing BT, TT, or ST partitioning according to a shape (or size) of a block. In Embodiment 1 described above, regardless of the shape of the block, if MaxDepth representing a maximum partitioning depth, MinBTSize representing a minimum size of the block partitioned by the binary-tree structure, or MinTTSize representing the minimum size of the block partitioned by the ternary-tree structure is not reached, partitioning is allowed. However, in the embodiment, the encoder/decoder may allow block partitioning adaptively according to a width or height (i.e., the shape of the block) of the block.

Figure 11:
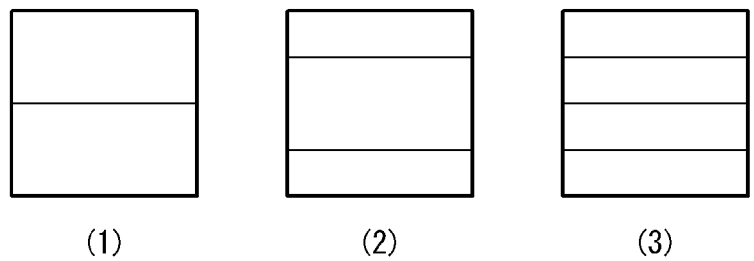
FIG. 11 is a diagram for describing a block partitioning structure of a square block as an embodiment to which the present disclosure is applied.

FIG. 11 is a diagram for describing a block partitioning structure of a square block as an embodiment to which the present disclosure is applied.

Referring to FIG. 11, it is assumed that the current block is a 2N×2N block. In an embodiment of the present disclosure, in a square block in which the width and the height are equal to each other, all of horizontal BT, TT, and ST partitionings are available and all of vertical BT, TT, and ST partitionings are available. That is, in the embodiment of the present disclosure, block partitioning limitation may not be applied to the square block.

Figure 12:
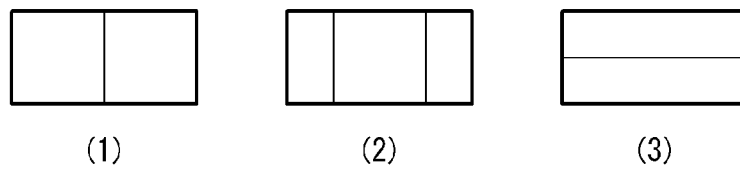
FIG. 12 is a diagram illustrating a block partitioning structure of a non-square block as an embodiment to which the present disclosure is applied.

FIG. 12 is a diagram illustrating a block partitioning structure of a non-square block as an embodiment to which the present disclosure is applied.

Referring to FIG. 12, it is assumed that a current processing block is a 2N×N block. In an embodiment, in a non-square block in which the width is twice larger than the height, only vertical BT and TT partitionings and horizontal BT partitioning may be allowed as illustrated in FIG. 12.

In other words, when the current block is the non-square block in which the width is larger than the height, horizontal and vertical ST partitionings may not be allowed. Further, when the current block is the non-square block in which the width is larger than the height, TT partitioning may not be allowed even for a horizontal direction.

According to the embodiment of the present disclosure, an inefficient partitioning structure is not allowed by considering a ratio of a width and a height to reduce the number of bits required for partitioning information signaling.

Figure 13:
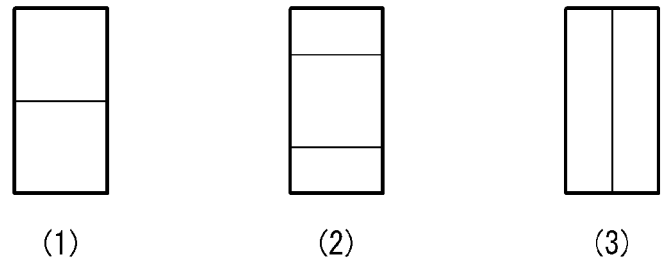
FIG. 13 is a diagram illustrating a block partitioning structure of a non-square block as an embodiment to which the present disclosure is applied.

FIG. 13 is a diagram illustrating a block partitioning structure of a non-square block as an embodiment to which the present disclosure is applied.

Referring to FIG. 13, it is assumed that the current block is an N×2N block. In an embodiment, in a non-square block in which the height is twice larger than the width, only the horizontal BT and TT partitionings and the vertical BT partitioning may be allowed as illustrated in FIG. 13.

In other words, when the current block is the non-square block in which the height is larger than the width, horizontal and vertical ST partitionings may not be allowed. Further, when the current block is the non-square block in which the height is larger than the width, the TT partitioning may not be allowed even for the vertical direction.

According to the embodiment of the present disclosure, the inefficient partitioning structure is not allowed by considering the ratio of the width and the height to reduce the number of bits required for partitioning information signaling.

Figure 14:
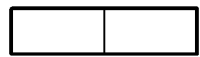
FIG. 14 is a diagram illustrating a block partitioning structure of a non-square block as an embodiment to which the present disclosure is applied.

FIG. 14 is a diagram illustrating a block partitioning structure of a non-square block as an embodiment to which the present disclosure is applied.

Referring to FIG. 14, it is assumed that the current block is a 2N×1/2N block. In an embodiment of the present disclosure, in a non-square block in which the width is four times larger than the height, only the vertical BT partitioning may be allowed as illustrated in FIG. 14.

In other words, when the current block is a block in which the width is four times or more larger than the height, the vertical TT and ST partitioning may not be allowed. Further, when the current block is a block in which the width is four times or more larger than the height, all partitionings may not be allowed for the horizontal direction.

According to the embodiment of the present disclosure, the inefficient partitioning structure is not allowed by considering the ratio of the width and the height to reduce the number of bits required for partitioning information signaling.

Figure 15:
FIG. 15 is a diagram illustrating a block partitioning structure of a non-square block as an embodiment to which the present disclosure is applied.

FIG. 15 is a diagram illustrating a block partitioning structure of a non-square block as an embodiment to which the present disclosure is applied.

Referring to FIG. 15, it is assumed that the current block is a 1/2N×2N block. In an embodiment of the present disclosure, in a non-square block in which the height is four times larger than the width, only the horizontal BT partitioning may be allowed as illustrated in FIG. 15.

In other words, when the current block is a block in which the height is four times or more larger than the width, the horizontal TT and ST partitioning may not be allowed. Further, when the current block is a block in which the height is four times or more larger than the width, all partitioning may not be allowed even for the vertical direction.

According to the embodiment of the present disclosure, the inefficient partitioning structure is not allowed by considering the ratio of the width and the height to reduce the number of bits required for partitioning information signaling.

In an embodiment, a method for limiting a specific partitioning according to the shape or size of the block may be applied only when the boundary of a CTU (or CTB, maximum size CU) is out of the boundary of the image (picture or slice).

Embodiment 3

In the present disclosure, proposed is a method for allowing BT, TT, or ST partitioning according to the shape (or size) of the block. According to Embodiment 2 described above, the encoder/decoder may allow block partitioning adaptively according to the shapes of the width and the height of the block. In Embodiment 2 described above, described is a method for allowing partitionings of various blocks for a block having a relatively large size and not allowing a specific partitioning according to the block shape for a relatively small block. On the contrary, in the embodiment of the present disclosure, proposed is a method for allowing more detailed block partitioning for the relatively small block.

Figure 16:
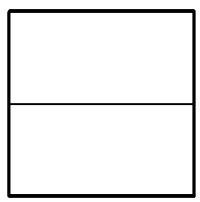
FIG. 16 is a diagram for describing a block partitioning structure of a square block as an embodiment to which the present disclosure is applied.
Figure 16:
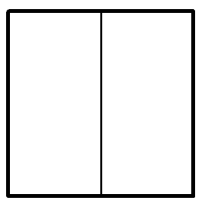

FIG. 16 is a diagram for describing a block partitioning structure of a square block as an embodiment to which the present disclosure is applied.

Referring to FIG. 16, it is assumed that the current block is a 2N×2N block. In an embodiment of the present disclosure, in a square block in which the width and the height are equal to each other, only the horizontal and vertical BT partitionings may be allowed as illustrated in FIG. 16. That is, in the square block in which the width and the height are equal to each other, the TT and ST partitionings may not be allowed.

Further, in an embodiment of the present disclosure, partitionings available for the 2N×N block and the N×2N block may be allowed for the same partitioning structure as in Embodiment 2 described above (see FIGS. 12 and 13).

According to the embodiment of the present disclosure, the inefficient partitioning structure is not allowed by considering the ratio of the width and the height to reduce the number of bits required for partitioning information signaling.

Figure 17:
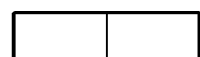
FIG. 17 is a diagram illustrating a block partitioning structure of a non-square block as an embodiment to which the present disclosure is applied.
Figure 17:
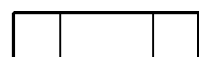
Figure 17:
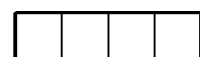

FIG. 17 is a diagram illustrating a block partitioning structure of a non-square block as an embodiment to which the present disclosure is applied.

Referring to FIG. 17, it is assumed that the current block is a 2N×1/2N block. In an embodiment of the present disclosure, in the non-square in which the width is four times larger than the height, only the vertical BT, TT, and ST partitionings may be allowed as illustrated in FIG. 17.

In other words, when the current block is a block in which the width is four times or more larger than the height, only the vertical partitioning may be allowed. Further, when the current block is a block in which the width is four times or more larger than the height, all partitionings may not be allowed even for the horizontal direction.

According to the embodiment of the present disclosure, the inefficient partitioning structure is not allowed by considering the ratio of the width and the height to reduce the number of bits required for partitioning information signaling.

Figure 18:
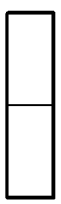
FIG. 18 is a diagram illustrating a block partitioning structure of a non-square block as an embodiment to which the present disclosure is applied.
Figure 18:
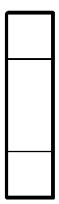
Figure 18:

FIG. 18 is a diagram illustrating a block partitioning structure of a non-square block as an embodiment to which the present disclosure is applied.

Referring to FIG. 18, it is assumed that the current block is a 1/2N×2N block. In an embodiment of the present disclosure, in a non-square in which the height is four times larger than the width, only the horizontal BT, TT, and ST partitioning may be allowed as illustrated in FIG. 15.

In other words, when the current block is a block in which the height is four times or more larger than the width, only horizontal partitioning may be allowed. Further, when the current block is a block in which the height is four times or more larger than the width, all partitioning may not be allowed even for the vertical direction.

According to the embodiment of the present disclosure, the inefficient partitioning structure is not allowed by considering the ratio of the width and the height to reduce the number of bits required for partitioning information signaling.

In an embodiment, a method for limiting specific partitioning according to the shape or size of the block may be applied only when the boundary of a CTU (or CTB, maximum size CU) is out of the boundary of the image (picture or slice).

Embodiment 4

In Embodiments 2 and 3 above, a method for determining a block partitioning structure in which a block may be partitioned according to the shape of the block is described. In an embodiment of the present disclosure, a syntax for determining the block partitioning structure according to the block shape may be transmitted in a high level syntax.

For example, the syntax for determining the block partitioning structure according to the block shape may be signaled from the encoder to the decoder through a Sequence Parameter Set, a Picture Parameter Set, a Tile Group Header, or a header of a Network Abstract Layer unit.

In an embodiment, the syntax for determining the block partitioning structure may be transmitted in the sequence parameter set (SPS) as shown in Table 6 below.

TABLE 6

| | Descriptor |
|---|---|
| sequence_parameter_set( ) { | |
| ... | |
| log2_size_bt_allow_ratio | u(v) |
| log2_size_tt_allow_ratio | u(v) |
| log2_size_st_allow_ratio | u(v) |
| } | |

Referring to Table 6, log 2_size_bt_allow_ratio represents a syntax (or syntax element) indicating an allowance range of the ratio (or a difference or a ratio of the difference) between the width and the height of the block for the BT partitioning. As an example, when the value is 1, the encoder/decoder may allow partitioning only in a case where a length of one side (i.e., width or height) of the block is equal to or less than twice the length of the other side and not allow block partitioning in a case where the length of one side is more than twice the length of the other side. In addition, log 2_size_bt_allow_ratio and log 2_size_st_allow_ratio represent syntaxes (or syntax elements) indicating the allowance range of the ratio (or the difference or the ratio of the difference) between the width and the height of the block for the partitioning for the TT and the ST, respectively.

Alternatively, in an embodiment, the syntax for determining the block partitioning structure may be transmitted in the sequence parameter set (SPS) as shown in Table 7 below.

TABLE 7

| | Descriptor |
|---|---|
| sequence_parameter_set( ) { | |
| ... | |
| log2_size_bt_disallow_ratio | u(v) |
| log2_size_tt_disallow_ratio | u(v) |
| log2_size_st_disallow_ratio | u(v) |
| } | |

Referring to Table 7, log 2_size_bt_disallow_ratio represents the syntax (or syntax element) indicating an allowance range of the ratio (or a difference or a ratio of the difference) between the width and the height of the block for the BT partitioning. As an example, when the value is 1, the encoder/decoder may not allow block partitioning in the case where the length of one side of the block is twice the length of the other side. In addition, log 2_size_bt_disallow_ratio and log 2_size_st_disallow_ratio represent syntaxes (or syntax elements) indicating the allowance range of the ratio (or the difference or the ratio of the difference) between the width and the height of the block for the partitionings for the TT and the ST, respectively.

The syntaxes of Tables 6 and 7 may be signaled from the encoder to the decoder through a Sequence Parameter Set, a Picture Parameter Set, a Tile Group Header, or a header of a Network Abstract Layer unit.

According to examples of Tables 6 and 7, when a ratio between the width and the height is within a predetermined range, the block partitioning is not allowed to efficiently determine the partitioning structure and reduce signaling bits required for determining the partitioning structure.

In an embodiment, the method for limiting the specific partitioning according to the shape or size of the block may be applied only when the boundary of a CTU (or CTB, maximum size CU) is out of the boundary of the image (picture or slice).

Embodiment 5

As described above, the QT structure may be used when the lengths of the width and the height of the block are equal to each other. In an embodiment of the present disclosure, when the block is spanned in a picture boundary area, that is, when a right or lower boundary of a current CTU (or a maximum coding unit, CTB) exceeds a current picture, the encoder/decoder may partition the current CTU into blocks having a maximum size, which may be BT or TT (i.e., multi type tree) partitioned without an additional syntax signaling.

In image compression technology in the related art, when the boundary of the CTU (or CTB, CU having the maximum size) is out of the boundary of the picture (or slice), the decoder may perform the QT partitioning until not being out of the boundary of the picture without parsing partitioning information signaled from the encoder (i.e., implicitly).

For example, when the current CTU is 64×64 and the picture (or slice) includes only a 64×32 area, the decoder may QT-partition the current CTU into four 32×32 CUs without parsing the partitioning information. In such a case, after a block having a size of 64×32 is implicitly partitioned into two 32×32 size blocks, the partitioning information is parsed. In the present disclosure, implicit partitioning may indicate a method for performing block partitioning according to a specific condition without partitioning information signaling and may be referred to as an automatic partitioning, a default partitioning, etc.

In the embodiment of the present disclosure, proposed is a method for minimizing CTU partitioning which is out of the picture boundary by not allowing the QT partitioning when the boundary of the CTU (or CTB, the CU having the maximum size) is out of the boundary of the picture. For example, when the current CTU is 64×64 and the picture (or slice) includes only the 64×32 area, the encoder/decoder may perform partitionings (e.g., BT, TT, and AT) other than the QT partitioning by not allowing the QT partitioning. For example, the BT partitioning may be performed instead of the QT partitioning and in this case, partitioning the block having the size of 64×32 adjacent to the picture (or slice) boundary may not start from two 32×32 size blocks but may start from the block having the size of 64×32 through parsing the partitioning information. According to the embodiment of the present disclosure, the QT partitioning is adjusted according to complexity of the image to determine an effective partitioning structure with relatively small partitioning information.

In an embodiment, when the boundary of the CTU (or CTB, the CU having the maximum size) is out of the boundary of the picture (or slice), the encoder may transmit, to the decoder, a syntax indicating whether the QT partitioning is allowed. The syntax indicating whether the QT partitioning is allowed may be transmitted in units of the sequence, the picture, or the slice (or tile group), for example. Table 8 below shows a QT partitioning limitation syntax signaled in a high level.

TABLE 8

| | Descriptor |
|---|---|
| sequence_parameter_set( ) { | |
| ... | |
| pic_boundary_qt_disable_flag | u(1) |
| } | |

Referring to Table 8, pic_boundary_qt_disable_flag represents a syntax (or syntax element) indicating whether partitioning by QT is to be allowed when the block size of the block in the boundary area of the picture is not equal to the maximum block size. As the embodiment, when the value of pic_boundary_qt_disable_flag is 1, the QT partitioning may not be allowed in the picture boundary area. The syntax may be signaled from the encoder to the decoder through the Picture Parameter Set, the Tile Group Header, or the header of the Network Abstract Layer unit in addition to the sequence parameter set.

Figure 19:
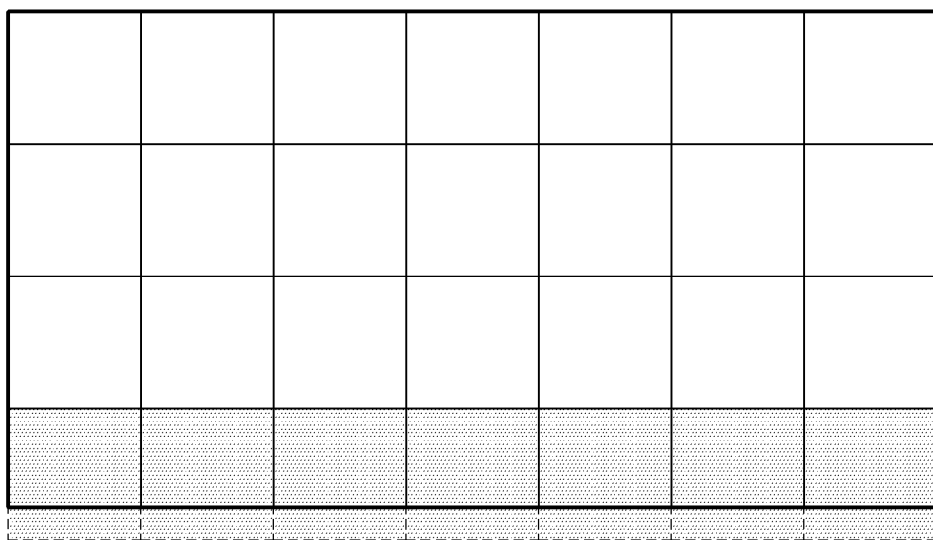
FIG. 19 is a diagram illustrating a case where a Coding tree unit (CTU) is out of a boundary of an image as an embodiment to which the present disclosure is applied.

FIG. 19 is a diagram illustrating a case where a Coding tree unit (CTU) is out of a boundary of an image as an embodiment to which the present disclosure is applied.

Referring to FIG. 19, the current picture may be partitioned into the CTU unit. In this case, the height of the current picture may not correspond to a multiple of the CTU height and in this case, as illustrated in FIG. 19, CTUs located on the bottom of the current picture may be out of the boundary of the current picture.

That is, an available block partitioning shape may be determined according to the block shape determined by Embodiments 2 to 4 described above and partitioning may be implicitly performed from a largest block in which the corresponding block may be partitioned. In this case, information for partitioning may not be included in the syntax. After the block is partitioned into the largest block which may be implicitly partitioned, the encoder may signal information on an optimal block partitioning structure.

Further, in another embodiment, when the boundary of the CTU (or CTB, the CU having the maximum size) is out of the boundary of the picture (or slice), the encoder and the decoder may equally determine whether the QT partitioning is allowed according to a specific condition. When the QT partitioning is not allowed, the encoder/decoder may partition the CTU by using the partitionings (e.g., BT, TT, and AT) other than the QT.

As an example, when the boundary of the CTU is out of the boundary of the image (picture or slice), the decoder may determine whether the QT partitioning is allowed based on a region (or a duplicated area) in which the CTU and the image overlap with each other. For example, the decoder may not allow the QT partitioning when the overlapped region is equal to or less than ½ of the CTU size and may allow the QT partitioning when the overlapped region is more than ½.

In this case, prior to the determining of whether the QT partitioning is allowed based on the overlapped region, checking (or determining) the overlapped region may be performed. The overlapped region may be calculated by using an area ratio in the CTU, a ratio of the width or the height compared to the CTU, an area/width/height ratio with a virtual region, etc. In the present disclosure, a remaining region (i.e., a region which is out of the boundary of the image (picture or slice) in the CTU) other than the region in which the CTU and the image overlap with each other in the CTU may be referred to as the virtual region. Thereafter, when the overlapped region (or area or ratio) is equal to or smaller than a predetermined region (or area or ratio), the QT partitioning may not be allowed and when the overlapped region is larger than the predetermined region, the QT partitioning may be allowed. Further, for example, the ratio of the overlapped region is compared with a specific threshold to determine whether the QT partitioning is allowed.

Further, as an example, when the boundary of the CTU is out of the boundary of the image (picture or slice), the decoder may determine whether the QT partitioning is allowed or the implicit partitioning structure based on the size of a transform (or a transform kernel or a transform matrix). For example, the decoder may not allow the QT partitioning when there is an available transform in the overlapped region. Alternatively, the decoder may determine whether the QT partitioning is allowed based on the overlapped region as in the above-described embodiments and determine the partitioning structure according to the size of the transform available for the overlapped region. For example, the decoder may partition the overlapped region into blocks in a maximum size unit of the available transform.

In an embodiment, the encoder/decoder may perform the QT partitioning without the syntax signaling for the current CTU when the overlapped region of the current CTU is larger than a maximum transform size. For example, the encoder/decoder may perform the QT partitioning without the syntax signaling for the current CTU when the width of the overlapped region, i.e., the region in the current picture other than the virtual region in the CTU is larger than a maximum transform size (or the length of one side of maximum transform) or the height of the overlapped region is larger than the maximum transform size.

Further, in another embodiment, when the boundary of the CTU (or CTB, the CU having the maximum size) is out of the boundary of the picture (or slice), the QT partitioning may be configured not to be continuously allowed. When the QT partitioning is not allowed, the corresponding CTU may be partitioned by using the partitionings (e.g., BT, TT, and AT) other than the QT. In this case, syntax signaling data may be reduced and partitioning of the block which is out of the picture boundary may be minimized.

According to the embodiment of the present disclosure, when the boundary of the CTU (or CTB or the CU having the maximum size) is out of the boundary of the image (picture or slice), the partitioning of the image in the corresponding CTU may be minimized and the size of initial partitioning blocks of the image in the corresponding CTU may be effectively determined. As a resolution of the image becomes larger and diversified, blocks of 128×128 and 256×256 which are sizes larger than those of old HEVC are also discussed as the CTU (or CTB or the CU having the maximum size) which is a basic unit of partitioning the image.

Accordingly, the CTU boundary may be frequently out of the boundary of the image, and if the QT partitioning is allowed even in any case as in the image compression technology in the related art, the boundary of the image may be unnecessarily partitioned into a small size and as encoding information is signaled in units of unnecessarily partitioned blocks, compression efficiency may significantly deteriorate on the boundary of the image. Table 9 below shows the size of a general image.

TABLE 9

| Resolution name | Horizontal × Vertical pixels | Other names | Devices |
| --- | --- | --- | --- |
| 8K | 7,680 × 4,320 | None | Concept TVs |
| "Cinema" 4K | 4,096 × (unspecified) | 4K | Projectors |
| UHD | 3,840 × 2,160 | 4K, Ultra HD, Ultra-High Definition | TVs |
| 2K | 2,048 × (unspecified) | None | Projectors |
| WUXGA | 1,920 × 1,200 | Wide screen Ultra Extended Graphics Array | Monitors, Projectors |
| 1080p | 1,920 × 1,080 | Full HD, FHD, HD, High Definition, 2K | TVs, monitors |
| 720p | 1,280 × 720 | HD, High Definition | TVs |

In the embodiment of the present disclosure, a case where the size of the CTU is 64×64 and 128×128 is primarily described, but the present disclosure is not limited thereto and may be similarly applied even to a case where the size of the CTU is 256×256 and 512×512. An 8 k image may have a resolution of 7680×4320 and in this case, all CTUs which belong to a lowest CTU line may be out of the boundary of the image. In this case, the above-described embodiments may be applied. Similarly, even in the case of a 4 k image having a resolution of 4096×2160, a UHD image having a resolution of 3840×2160, and an FHD image having a resolution of 1920×1080, all CTUs which belong to the lowest CTU line may be out of the boundary of the image and the above-described embodiments may be applied.

Embodiment 6

Figure 20:
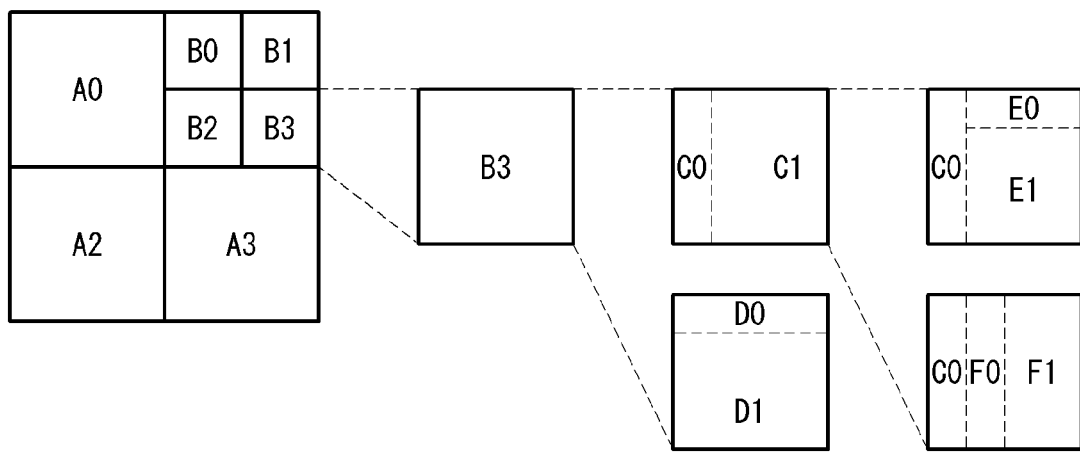
FIG. 20 is a diagram illustrating an asymmetric-tree based block partitioning structure as an embodiment to which the present disclosure is applied.

FIG. 20 is a diagram illustrating an asymmetric-tree based block partitioning structure as an embodiment to which the present disclosure is applied.

Referring to FIG. 20, the AT may have four types of partitions: horizontal-up AT (2N×1/2N, 2N×3/2N), horizontal-down AT (2N×3/2N, 2N×1/2N), vertical-left AT (1/2N× 2N, 3/2N×2N), and vertical-right AT (3/2N×2N, 1/2N×2N).

As an example, the block B3 which is not partitioned by the QT any longer may be partitioned by vertical AT (C0, C1) or horizontal AT (D0, D1). Like the block C1, each subblock may be further recursively partitioned like a form of horizontal AT (E0, E1) or vertical TT (F0, F1).

Figure 21:
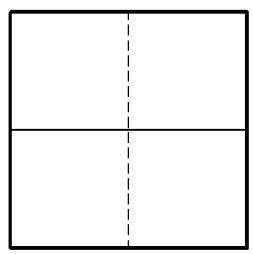
FIGS. 21 to 23 are diagrams illustrating an example of block partitioning according to an embodiment to which the present disclosure may be applied.
Figure 21:
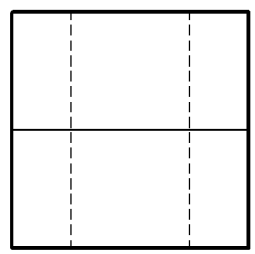
Figure 21:
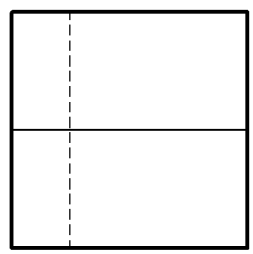
Figure 21:
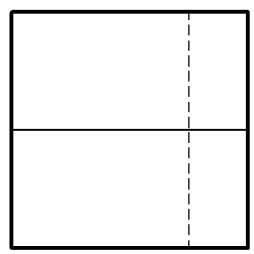
Figure 21:
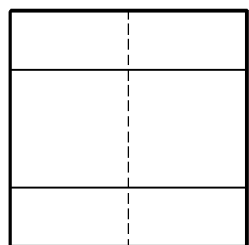
Figure 21:
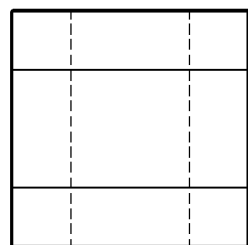
Figure 21:
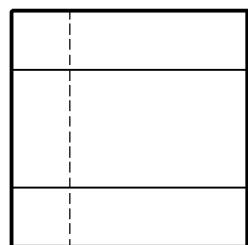
Figure 21:
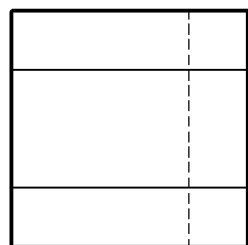
Figure 21:
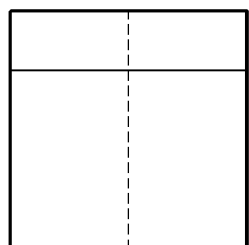
Figure 21:
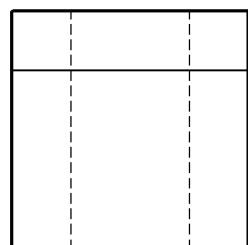
Figure 21:
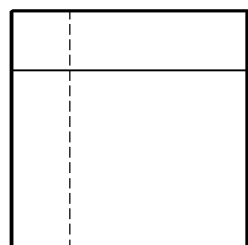
Figure 21:
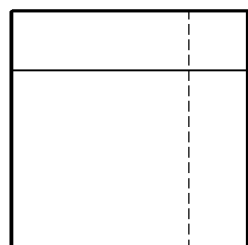
Figure 22:
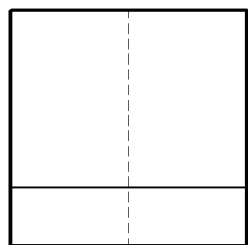
Figure 22:
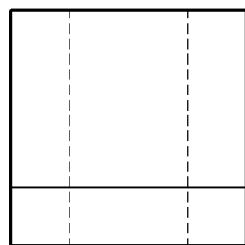
Figure 22:
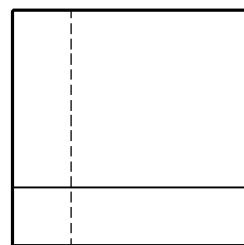
Figure 22:
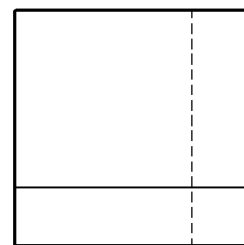
Figure 22:
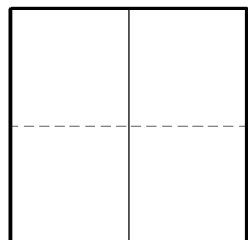
Figure 22:
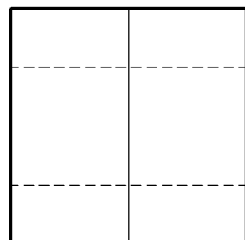
Figure 22:
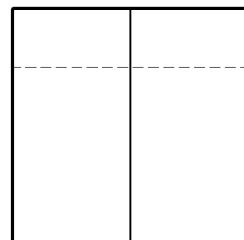
Figure 22:
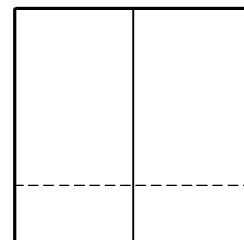
Figure 22:
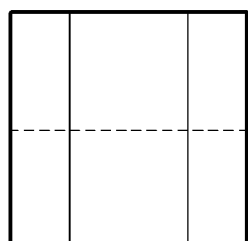
Figure 22:
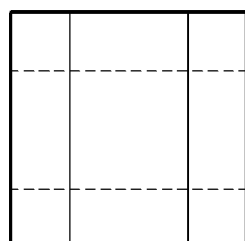
Figure 22:
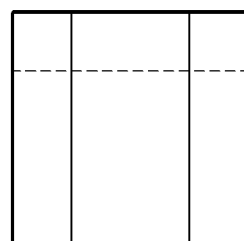
Figure 22:
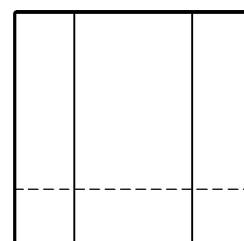
Figure 23:
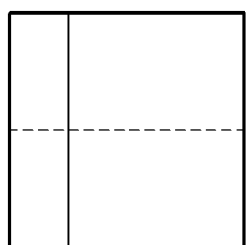
Figure 23:
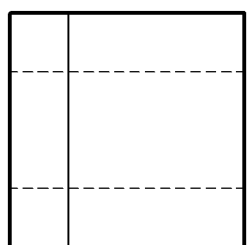
Figure 23:
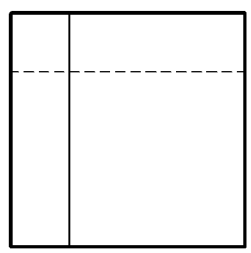
Figure 23:
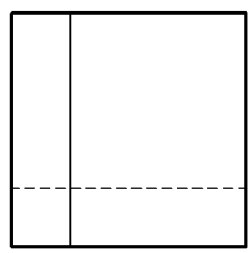
Figure 23:
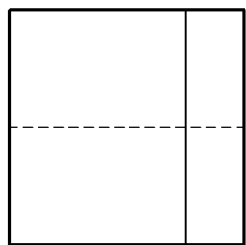
Figure 23:
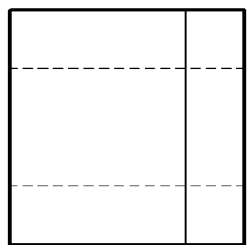
Figure 23:
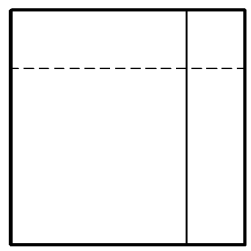
Figure 23:
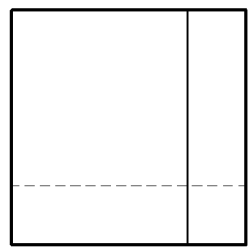

FIGS. 21 to 23 are diagrams illustrating an example of block partitioning according to an embodiment to which the present disclosure may be applied.

Referring to FIGS. 21 to 23, the BT, TT, and AT partitions may be used together. For example, the subblock partitioned by the BT may be partitioned by the TT or AT. Further, the subblock partitioned by the TT may be partitioned by the BT or AT. Further, the subblock partitioned by the AT may be partitioned by the BT or TT.

In FIGS. 21 to 23, a partition expressed by a solid line indicates a first partition and a partition expressed by a dotted line indicates a second partition of the subblock generated by the first partition. For example, FIGS. 21(1) to 21(4) illustrate that respective subblocks are partitioned by vertical BT, vertical TT, vertical-left AT, and vertical-right AT after the horizontal BT partitioning. FIGS. 21(5) to 21(8) illustrate that respective subblocks are partitioned by vertical BT, vertical TT, vertical-left AT, and vertical-right AT after the horizontal TT partitioning.

FIGS. 21(9) to 21(12) illustrate that respective subblocks are partitioned by vertical BT, vertical TT, vertical-left AT, and vertical-right AT after the horizontal-top AT partitioning. FIGS. 22(13) to 22(16) illustrate that respective subblocks are partitioned by vertical BT, vertical TT, vertical-left AT, and vertical-right AT after the horizontal-bottom AT partitioning.

FIGS. 22(17) to 22(20) illustrate that respective subblocks are partitioned by horizontal BT, horizontal TT, horizontal-top AT, and vertical-bottom AT after the vertical BT partitioning. FIGS. 22(21) to 22(24) illustrate that respective subblocks are partitioned by horizontal BT, horizontal TT, horizontal-top AT, and horizontal-bottom AT after the vertical TT partitioning.

FIGS. 23(25) to 23(28) illustrate that respective subblocks are partitioned by horizontal BT, horizontal TT, horizontal-top AT, and horizontal-bottom AT after the vertical-left AT partitioning. FIGS. 23(29) to 23(32) illustrate that respective subblocks are partitioned by horizontal BT, horizontal TT, horizontal-top AT, and horizontal-bottom AT after the vertical-right AT partitioning.

Embodiment 7

A degree of freedom of partitioning is increased through block partitioning of various structures to increase compression efficiency, while an increase in complexity due to an enhanced partitioning degree of freedom may become a problem. Accordingly, in an embodiment of the present disclosure, proposed is a method for transmitting a syntax for adjusting a QT partitioning degree by considering a relationship between performance and complexity in performing block partitioning based on the QT structure.

As the embodiment, the encoder may transmit, to the decoder, at least one of a maximum QT block size (MaxQTSize) syntax, a minimum QT block size (MinQTSize) syntax, and a maximum QT block partitioning depth (MaxQTDepth) syntax (or syntax element). Here, the maximum QT block size may indicate the maximum size of the block in which QT partitioning may be performed and may be expressed as a form (e.g., log 2) of a log scale. The minimum QT block size may indicate the minimum size of the block in which QT partitioning may be performed and may be expressed as the form (e.g., log 2) of the log scale. Further, the maximum QT partitioning depth indicates how many times the QT partitioning is allowed from the maximum QT block size.

Further, as the embodiment, the encoder may transmit, to the decoder, at least one of a maximum BT block size (MaxBTSize) syntax, a minimum BT block size (MinBTSize) syntax, and a maximum BT block partitioning depth (MaxBTDepth) syntax (or syntax element). Here, the maximum BT block size may indicate the maximum size of the block in which BT partitioning may be performed and may be expressed as the form (e.g., log 2) of the log scale. Here, the minimum BT block size may indicate the minimum size of the block in which BT partitioning is allowed and may be expressed as the form (e.g., log 2) of the log scale. Further, the maximum BT partitioning depth indicates how many times the BT partitioning is allowed from the maximum BT block size.

Further, as the embodiment, the encoder may transmit, to the decoder, at least one of a maximum TT block size (MaxTTSize) syntax, a minimum TT block size (MinTTSize) syntax, and a maximum TT block partitioning depth (MaxTTDepth) syntax (or syntax element). Here, the maximum TT block size may indicate the maximum size of the block in which TT partitioning may be performed and may be expressed as the form (e.g., log 2) of the log scale. Here, the minimum TT block size may indicate the minimum size of the block in which TT partitioning is allowed and may be expressed as the form (e.g., log 2) of the log scale. Further, the maximum TT partitioning depth indicates how many times the TT partitioning is allowed from the maximum TT block size.

Respective syntax information may be transmitted through a Sequence Parameter Set (SPS), a Picture Parameter Set (PPS), a Slice Header (SH) (or Tile Group Header (TGH), or a header of a Network Abstract Layer unit according to types of slice (or tile group), tile, and image component.

Embodiment 8

In Embodiment 7 described above, a syntax for the maximum size or the minimum size or a maximum partitioning allowance depth for QT, BT, and TT partitioning in the image is defined. In the present disclosure, block sizes of coding unit (CU), prediction unit (PU), and transform unit (TU) may be equal to each other, or may not be equal to each other.

In an embodiment of the present disclosure, proposed is a method in which the encoder transmit a syntax for adjusting the partitioning degrees of CU, PU, and TU by considering the relationship between the performance and the complexity when the sizes of CU, TU, and PU are different from each other. In the present disclosure, TU may mean a unit which is partitioned by a tree structure (e.g., QT, QTBT, QTBT+TT, etc.) according to partitioning information signaled from the encoder and transformed or TU may mean a unit which is implicitly partitioned according to the size of the transform kernel (or transform matrix) and transformed.

In an embodiment, when the TU means the unit which is partitioned by the tree structure according to the partitioning information signaled from the encoder and transformed, the blocks such as CU and PU may be recursively partitioned according to the signaled partitioning information.

In another embodiment, when the TU means the unit which is implicitly partitioned according to the size of the transform kernel (or transform matrix) and transformed, the encoder and the decoder may equally partition the blocks such as CU and PU based on the size of the transform kernel stored without signaling of partitioning information. That is, the TU partitioning may be determined dependently on the transform kernel size. For example, when the size of the CU or PU is 128×128 and the maximum size of an applicable (or predetermined) transform kernel is 64×64, the encoder and the decoder may perform transform after partitioning the CU or PU into four 64×64 blocks without signaling separate partitioning information for transform. An example of an implicit partitioning method for transform will be described in the following drawing.

Figure 24:
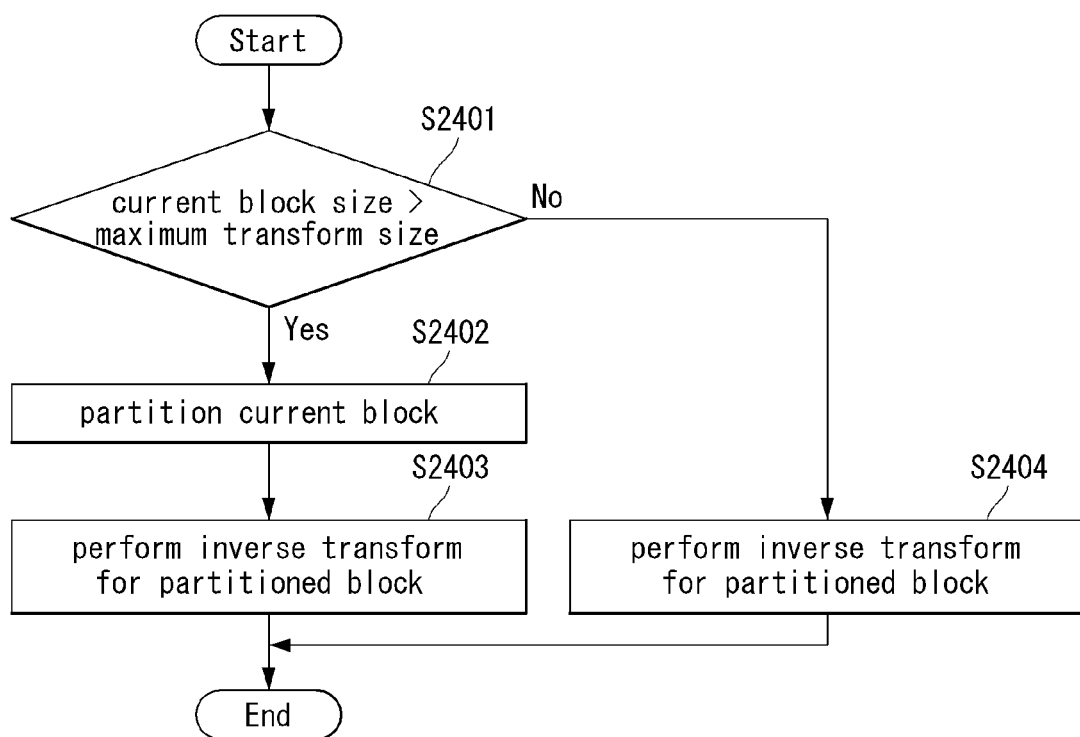
FIG. 24 is a diagram illustrating a method for determining whether a block is partitioned based on a maximum transform block size without a syntax signaling as an embodiment to which the present disclosure is applied.

FIG. 24 is a diagram illustrating a method for determining whether a block is partitioned based on a maximum transform block size without a syntax signaling as an embodiment to which the present disclosure is applied.

Referring to FIG. 24, the decoder may check whether the current block size is larger than the maximum transform size (or the maximum size of the transform kernel or the maximum size of the transform matrix) (S2401).

The decoder may partition the current block when the current block size is larger than the maximum transform size (S2402). In this case, the decoder may partition the current block in the maximum transform size unit. The current block may be partitioned in the maximum transform size unit only in the case of inverse transform. The decoder may perform the inverse transform for the partitioned blocks (S2403).

Meanwhile, in step S2401, when the current block size is not larger than the maximum transform size, the decoder may perform the inverse transform for the current block.

In an embodiment, syntaxes such as a maximum CU block size (MaxCUSize), a minimum CU block size (MinCUSize), a maximum CU block partitioning depth (MaxCUDepth), etc., may be transmitted. More specifically, the maximum CU block size may mean the size of a largest block into which an image is initially partitioned and may be expressed as the form of the log 2 scale. This may be used similarly to or replaced with the syntaxes such as the maximum QT block size (MaxQTSize), the minimum QT block size (MinQTSize), and the maximum QT block partitioning depth (MaxQTDepth), etc., and used.

In another embodiment, syntaxes such as a maximum PU block size (MaxPUSize), a minimum PU block size (MinPUSize), a maximum PU block partitioning depth (MaxPUDepth), etc., may be transmitted. More specifically, the maximum PU block size may mean the size of a largest block into which an image is initially partitioned and may be expressed as the form of the log 2 scale. For example, when the maximum CU size is larger than the maximum PU size, the corresponding CU may be implicitly partitioned without signaling information up to the maximum PU. Specifically, when the maximum PU size is 64×64 and the maximum CU size is 128×128, prediction may be performed for the 128×128 block by using four 64×64 PUs. Alternatively, the corresponding block may be implicitly partitioned into four sub-PUs. Prediction for a 128×64 block may be performed by using two 64×64 PUs. Prediction for a 128×32 block may be performed by using two 64×32 PUs or four 32×32 PUs. When the CU and the PU are equal to each other, the syntax may not be transmitted. Alternatively, the syntax may be explicitly transmitted.

In another embodiment, syntaxes such as a maximum TU block size (MaxTUSize), a minimum TU block size (MinTUSize), a maximum TU block partitioning depth (MaxTUDepth), etc., may be transmitted. More specifically, the maximum TU block size may mean the size of a largest block into which an image is initially partitioned and may be expressed as the form of the log 2 scale. For example, when the maximum CU size is larger than the maximum TU size, the corresponding CU may be implicitly partitioned without signaling information up to the maximum TU. Specifically, when the maximum TU size is 64×64 and the maximum CU size is 128×128, transform may be performed for the 128×128 block by using four 64×64 TUs. Alternatively, the corresponding block may be implicitly partitioned into four sub-CUs. Transform for the 128×64 block may be performed by using two 64×64 TUs. Transform for the 128×32 block may be performed by using two 64×32 TUs or four 32×32 TUs. When the CU and the TU are equal to each other, the syntax may not be transmitted. Alternatively, the syntax may be explicitly transmitted.

In another embodiment, implicit partitioning based on the transform size may be performed for a TT or AT partitioned CU from the maximum size CU (or CTU). For example, when the maximum size CU is 128×128 and only one TT partitioning is performed, two 32×128 CUs and one 64×128 CUs may be generated. When the maximum size of the transform kernel is assumed as 64×64, the encoder/decoder may partition 32×128 CU into two 64×32 TUs or partition the 32×128 CU into four 32×32 TUs without a separate signaling when performing the transform. In this case, TU partitioning may be determined in units of an applicable transform kernel or predetermined size. In addition, the encoder/decoder may partition a 64×128 CU into two 64×64 TUs without a separate signaling when performing the transform.

Further, for example, when the maximum size CU is 128×128 and only one AT partitioning is performed, one 32×128 CU and one 96×128 CU may be generated. When the maximum size of the transform kernel is assumed as 64×64, the encoder/decoder may partition 32×128 CU into two 64×32 TUs or partition the 32×128 CU into four 32×32 TUs without a separate signaling when performing the transform. In this case, TU partitioning may be determined in units of an applicable transform kernel or predetermined size. In addition, the encoder/decoder may partition the 96×128 CU into two 64×64 TUs and two 64×32 TUs without a separate signaling or partition the 96×128 CU into two 64×64 TUs or four 32×32 TUs.

Further, when the maximum PU size is larger than the maximum TU size, the corresponding PU may be implicitly partitioned without signaling information up to the maximum TU. Specifically, when the maximum TU size is 64×64 and the maximum PU size is 128×128, transform may be performed for the 128×128 block by using four 64×64 TUs. Alternatively, the corresponding block may be implicitly partitioned into four sub-PUs. Transform may be performed for the 128×64 block by using two 64×64 TUs. Prediction may be performed for the 128×32 block by using two 64×32 TUs or four 32×32 TUs. When the PU and the TU are equal to each other, the syntax may not be transmitted. Alternatively, the syntax may be explicitly transmitted.

In an embodiment, implicit partitioning based on the transform size may be performed for a TT or AT partitioned PU from the maximum size PU. For example, when the maximum size PU is 128×128 and only one TT partitioning is performed, two 32×128 PUs and one 64×128 PU may be generated. When the maximum size of the transform kernel is assumed as 64×64, the encoder/decoder may partition a 32×128 PU into two 64×32 TUs or partition the 32×128 PU into four 32×32 TUs without a separate signaling when performing the transform. In this case, TU partitioning may be determined in units of an applicable transform kernel or predetermined size. In addition, the encoder/decoder may partition a 64×128 PU into two 64×64 TUs without a separate signaling when performing the transform.

Further, for example, when the maximum size PU is 128×128 and only one AT partitioning is performed, one 32×128 PU and one 96×128 PU may be generated. When the maximum size of the transform kernel is assumed as 64×64, the encoder/decoder may partition a 32×128 PU into two 64×32 TUs or partition the 32×128 PU into four 32×32 TUs without a separate signaling when performing the transform.

In this case, TU partitioning may be determined in units of an applicable transform kernel or predetermined size. In addition, the encoder/decoder may partition the 96×128 PU into two 64×64 TUs and two 64×32 TUs without a separate signaling or partition the 96×128 PU into two 64×64 TUs or four 32×32 TUs.

Further, when the size of the PU is smaller than the minimum TU size, the corresponding block may be performed by combining multiple blocks satisfying a minimum TU. Alternatively, partitioning a PU smaller than the minimum TU size may not be allowed. Specifically, when the minimum TU size is 8×8 and the minimum PU size is 4×4, transform may be performed by collecting four 4×4 blocks and using one 8×8 TU. Alternatively, partitioning the corresponding block into the 4×4 PU may be implicitly limited.

Since the complexity of the encoder may be reduced by using the syntax information and the decoder may implicitly derive the partitioning information of the block, there may be a bit reduction effect.

Respective syntax information may be transmitted through a Sequence Parameter Set (SPS), a Picture Parameter Set (PPS), a Slice Header (SH) (or Tile Group Header (TGH), or a header of a Network Abstract Layer unit according to types of slice (or tile group), tile, and image component.

The embodiments of the present disclosure descried above have been described separately for the convenience of description, but the present disclosure is not limited thereto. In other words, each of Embodiments 1 to 8 described above may be independently performed and one or more various embodiments may be combined and performed.

Figure 25:
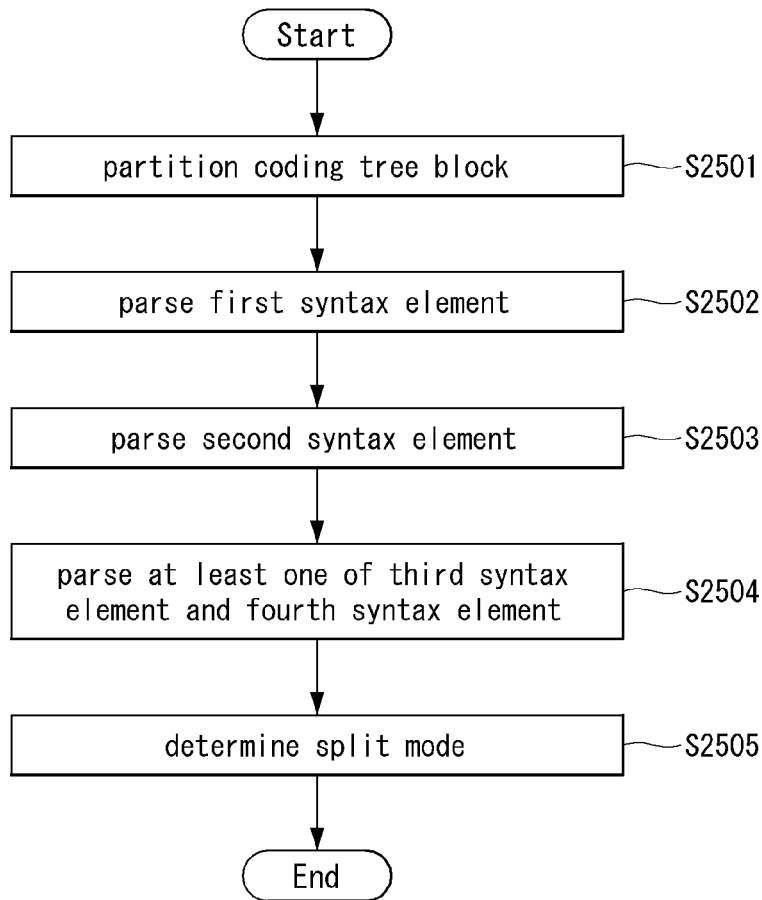
FIG. 25 is a flowchart illustrating a decoding method of a video signal according to an embodiment to which the present disclosure is applied.

FIG. 25 is a flowchart illustrating a decoding method of a video signal according to an embodiment to which the present disclosure is applied.

Referring to FIG. 25, the decoder is primarily described for convenience of description, but the present disclosure is not limited thereto and the method for decoding the video signal according to the embodiment of the present disclosure may be performed similarly in the encoder and the decoder.

When a current coding tree block is out of a boundary of a current picture, the decoder partitions the current coding tree block into a plurality of coding blocks so that coding blocks partitioned from the current coding tree block are included in the current picture (S2501).

When a current coding block satisfies a predetermined condition, the decoder parses a first syntax element indicating whether the current coding block is partitioned into a plurality of subblocks (S2502).

When the first syntax element indicates that the current coding block is partitioned, the decoder parses a second syntax element indicating whether the current coding block is partitioned by using a quad-tree structure (S2503).

When the second syntax element indicates that the current coding block is not partitioned by using the quad-tree structure, the decoder parses at least one of a third syntax element indicating whether the current coding block is partitioned by using a binary-tree structure or whether the current coding block is partitioned by using a ternary-tree structure and a fourth syntax element indicating a split direction of the current coding block (S2504).

The decoder determines a split mode of the current coding block based on at least one of the first syntax element, the second syntax element, the third syntax element, and the fourth syntax element (S2505).

As described above in Embodiment 5, the step of the partitioning of the current coding tree block into the plurality of coding blocks may be performed by partitioning the current coding tree block into a plurality of coding blocks by using the binary-tree structure or the ternary-tree structure until reaching a valid region in the current coding tree block, and here, the valid region may represent a region which is located within the boundary of the current picture in the current coding tree block.

Further, as described above in Embodiment 5, the partitioning of the current coding tree block into the plurality of coding blocks may further include parsing a fifth syntax element indicating whether quad-tree splitting is allowed when the current coding tree block is out of the boundary of the current picture, and when the fifth syntax element indicates that the quad-tree splitting is not allowed, the current coding tree block may be partitioned into the plurality of coding blocks by using the binary-tree structure or the ternary-tree structure.

Further, as described above in Embodiment 5, the fifth syntax element may be signaled through a Sequence Parameter Set, a Picture Parameter Set, a Tile Group Header, or a header of a Network Abstract Layer unit.

Further, as described above in Embodiment 5, the partitioning of the current coding tree block into the plurality of coding blocks may be performed by partitioning the current coding tree block into a plurality of coding blocks by using the binary-tree structure or the ternary-tree structure until reaching the valid region in the current coding tree block, and here, the valid region may represent the region which is located within the boundary of the current picture in the current coding tree block.

Further, as described above in Embodiment 5, the partitioning of the current coding tree block into the plurality of coding blocks may be performed by partitioning the current coding tree block into the coding blocks by using the quad-tree structure when a width of the valid region is larger than a maximum transform size or a height of the valid region is larger than the maximum transform size.

Further, in an embodiment, when the first system element value is 0, the current block may not be partitioned and when the first syntax element value is 1, the current block may be partitioned into four subblocks by using the quad-tree structure, partitioned into two subblocks by using the binary-tree structure, or partitioned into three subblocks by using the ternary-tree structure.

Further, in an embodiment, the predetermined condition may be satisfied when a value acquired by adding the width of the current block to a horizontal coordinate of a top-left sample of the current block is equal to or smaller than the width of the current picture and a value acquired by adding the height of the current block to a vertical coordinate of the top-left sample of the current block is equal to or smaller than the height of the current picture.

Further, in an embodiment, the decoder may invoke a coding unit syntax for determining the partitioning structure of the current block. In this case, invoking the coding tree unit syntax for the current block may be performed prior to step S1501.

Further, in an embodiment, when the first syntax element indicates that the current block is not partitioned, the decoder may invoke a coding unit syntax for a decoding process of the current block.

Further, in an embodiment, the decoder may invoke a coding tree unit syntax for determining the partitioning structure of the subblock partitioned from the current block based on the split mode.

Further, in an embodiment, the first syntax element, the second syntax element, the third syntax element, and the fourth syntax element may be parsed in a syntax of the same level.

Figure 26:
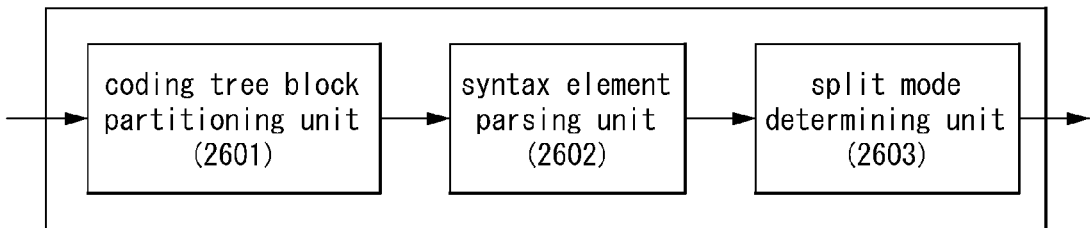
FIG. 26 is a diagram illustrating a decoding apparatus of a video signal according to an embodiment to which the present disclosure is applied.

FIG. 26 is a diagram illustrating a decoding apparatus of a video signal according to an embodiment to which the present disclosure is applied.

In FIG. 26, the decoding apparatus is illustrated as one block for convenience of description, but the decoding apparatus illustrated in FIG. 26 may be implemented in a component included in the encoder and/or the decoder.

Referring to FIG. 26, the decoding apparatus implements the functions, procedures, and/or methods proposed in FIGS. 1 to 25 above. Specifically, the decoding apparatus may be configured to include a coding tree block partitioning unit 2601, a syntax element parsing unit 2602, and a split mode determining unit 2603. Further, in an embodiment, the coding tree block partitioning unit 2601 and the syntax element parsing unit 2602 may be implemented as components included in the split mode determining unit 2603.

When a current coding tree block is out of a boundary of a current picture, the coding tree block partitioning unit 2601 partitions the current coding tree block into a plurality of coding blocks so that coding blocks partitioned from the current coding tree block are included in a current picture.

When a current coding block satisfies a predetermined condition, the syntax element parsing unit 2602 parses a first syntax element indicating whether the current coding block is partitioned into a plurality of subblocks.

When the first syntax element indicates that the current coding block is partitioned, the syntax element parsing unit 2602 parses a second syntax element indicating whether the current coding block is partitioned by using a quad-tree structure.

When the second syntax element indicates that the current coding block is not partitioned by using the quad-tree structure, the syntax element parsing unit 2602 parses at least one of a third syntax element indicating whether the current coding block is partitioned by using a binary-tree structure or whether the current coding block is partitioned by using a ternary-tree structure and a fourth syntax element indicating a split direction of the current coding block.

The split mode determining unit 2603 determining a split mode of the current coding block based on at least one of the first syntax element, the second syntax element, the third syntax element, and the fourth syntax element.

As described above in Embodiment 5, the coding tree block partitioning unit 2601 may partition the current coding tree block into the plurality of coding blocks by using the binary-tree structure or the ternary-tree structure until reaching a valid region in the current coding tree block. Here, the valid region may represent a region which belongs to the boundary of the current picture in the current coding tree block.

Further, as described above in Embodiment 5, when the current coding tree block is out of the boundary of the current picture, the coding tree block partitioning unit 2601 may parse a fifth syntax element indicating whether quad-tree splitting is allowed. When the fifth syntax element indicates that the quad-tree splitting is not allowed, the current coding tree block may be partitioned into the plurality of coding blocks by using the binary-tree structure or the ternary-tree structure.

Further, as described above in Embodiment 5, the fifth syntax element may be signaled through a Sequence Parameter Set, a Picture Parameter Set, a Tile Group Header, or a header of a Network Abstract Layer unit.

Further, as described above in Embodiment 5, the coding tree block partitioning unit 2601 may partition the current coding tree block into the plurality of coding blocks by using the quad-tree structure or the ternary-tree structure until reaching a valid region in the current coding tree block. Here, the valid region may represent a region which belongs to the boundary of the current picture in the current coding tree block.

Further, as described above in Embodiment 5, the coding tree block partitioning unit 2601 may partition the current coding tree block into the coding blocks by using the quad-tree structure when a width of the valid region is larger than a maximum transform size or a height of the valid region is larger than the maximum transform size.

Further, in an embodiment, when the first system element value is 0, the current block may not be partitioned and when the first syntax element value is 1, the current block may be partitioned into four subblocks by using the quad-tree structure, partitioned into two subblocks by using the binary-tree structure, or partitioned into three subblocks by using the ternary-tree structure.

Further, in an embodiment, the predetermined condition may be satisfied when a value acquired by adding the width of the current block to a horizontal coordinate of a top-left sample of the current block is equal to or smaller than the width of the current picture and a value acquired by adding the height of the current block to a vertical coordinate of the top-left sample of the current block is equal to or smaller than the height of the current picture.

Further, in an embodiment, the decoder may invoke a coding unit syntax for determining the partitioning structure of the current block. In this case, a step of invoking the coding tree unit syntax for the current block may be performed prior to step S1501.

Further, in an embodiment, when the first syntax element indicates that the current block is not partitioned, the decoder may invoke a coding unit syntax for a decoding process of the current block.

Further, in an embodiment, the decoder may invoke a coding tree unit syntax for determining the partitioning structure of the subblock partitioned from the current block based on the split mode.

Further, in an embodiment, the first syntax element, the second syntax element, the third syntax element, and the fourth syntax element may be parsed in a syntax of the same level.

Figure 27:
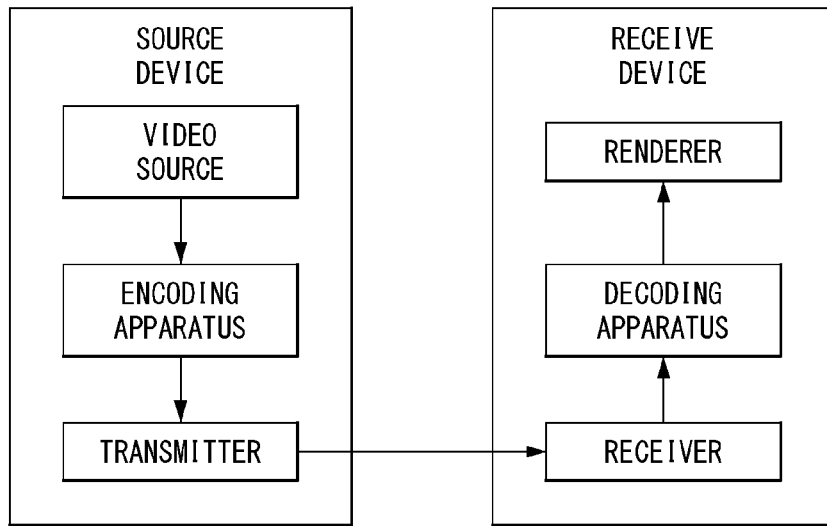
FIG. 27 illustrates a video coding system to which the present disclosure is applied.

FIG. 27 illustrates a video coding system to which the present disclosure is applied.

A video coding system may include a source device and a receiving device. The source device may forward encoded video/image information or data to the receiving device in a file or streaming format through a digital storage medium or a network.

The source device may include a video source, an encoding apparatus and a transmitter. The receiving device may include a receiver, a decoding apparatus and a renderer. The encoding apparatus may be called a video/image encoding apparatus, and the decoding apparatus may be called a video/image decoding apparatus. The transmitter may be included in the encoding apparatus. The receiver may be included in the decoding apparatus. The renderer may include a display unit, and the display unit may be constructed as an independent device or an external component.

The video source may obtain video/image through processes such as capturing, composing or generating. The video source may include a video/image capturing device and/or a video/image generating device. The video/image capturing device may include one or more cameras, video/image archive including a video/image captured previously, and the like, for example. The video/image generating device may include a computer, a tablet and a smart phone, for example, and may generate video/image (electrically), for example. For example, a virtual video/image may be generated through a computer, and in this case, the video/image capturing process may be substituted by the process of generating a related data.

The encoding apparatus may encode an input video/image. The encoding apparatus may perform a series of processes including a prediction, a transform, a quantization, and the like for compression and coding efficiency.

The transmitter may forward encoded video/image information or data output in a bitstream format to the receiver of the receiving device in a file or streaming format through a digital storage medium or a network. The digital storage medium may include various storage media such as USB, SD, CD, DVD, Blu-ray, HDD, SSD, and the like. The transmitter may include an element for generating a media file through a predetermined file format and may include an element for transmitting through broadcasting/communication network. The receiver may extract the bitstream and forward it to the decoding apparatus.

The decoding apparatus may perform a series of processes including a dequantization, an inverse transform, a prediction, and the like that corresponds to the operation of the encoding apparatus and decode video/image.

The renderer may render the decoded video/image. The rendered video/image may be displayed through the display unit.

Figure 28:
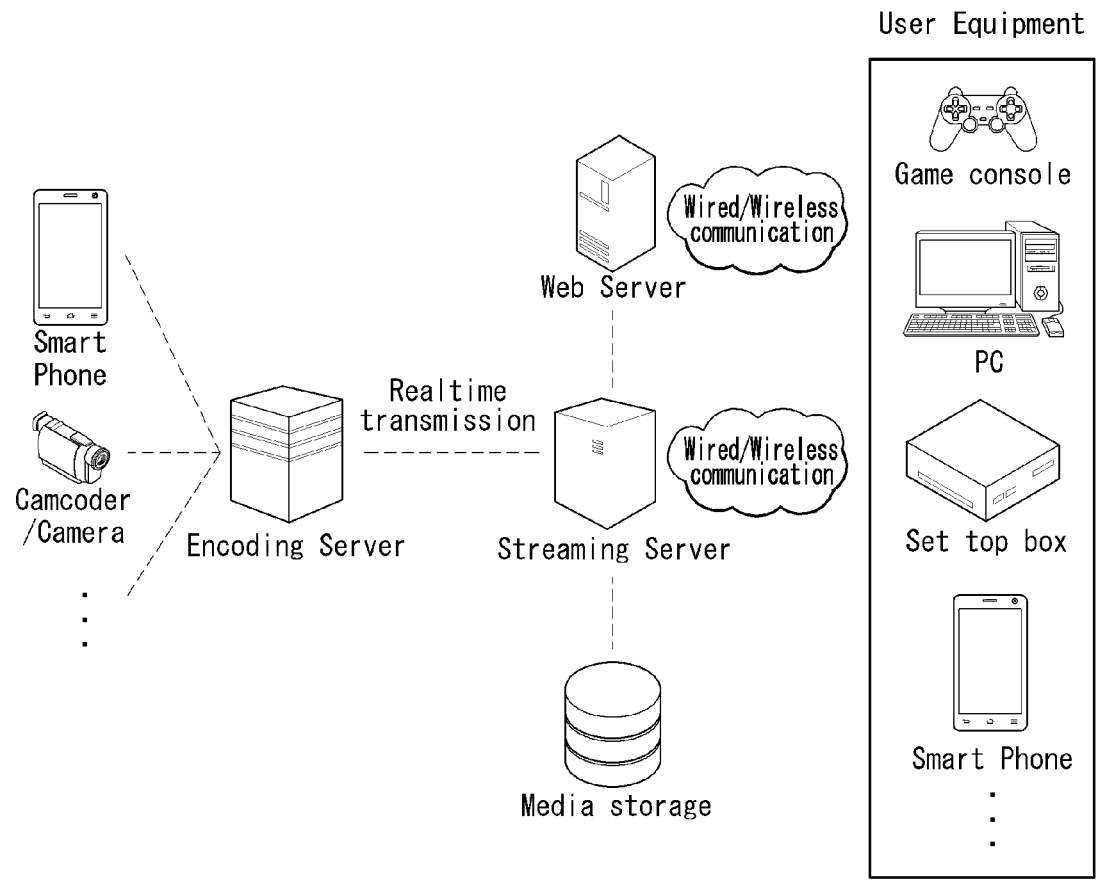
FIG. 28 is an architectural diagram of a content streaming system as an embodiment to which the present disclosure is applied.

FIG. 28 is a configuration diagram of a content streaming system as an embodiment to which the present disclosure is applied.

Referring to FIG. 28, the content streaming system to which the present disclosure is applied may include an encoding server, a streaming server, a web server, a media storage, a user equipment, and multimedia input devices.

The encoding server serves to compress content input from multimedia input devices such as a smartphone, a camera and a camcorder into digital data to generate a bitstream and transmit the bitstream to the streaming server. As another example, when the multimedia input devices such as a smartphone, a camera and a camcorder directly generate bitstreams, the encoding server may be omitted.

The bitstream may be generated by an encoding method or a bitstream generation method to which the present disclosure is applied and the streaming server can temporarily store the bitstream in the process of transmitting or receiving the bitstream.

The streaming server transmits multimedia data to the user equipment on the basis of a user request through the web server and the web server serves as a medium that informs a user of services. When the user sends a request for a desired service to the web server, the web server delivers the request to the streaming server and the streaming server transmits multimedia data to the user. Here, the content streaming system may include an additional control server, and in this case, the control server serves to control commands/responses between devices in the content streaming system.

The streaming server may receive content from the media storage and/or the encoding server. For example, when content is received from the encoding server, the streaming server can receive the content in real time. In this case, the streaming server may store bitstreams for a predetermined time in order to provide a smooth streaming service.

Examples of the user equipment may include a cellular phone, a smartphone, a laptop computer, a digital broadcast terminal, a PDA (personal digital assistant), a PMP (portable multimedia player), a navigation device, a slate PC, a tablet PC, an ultrabook, a wearable device (e.g., a smartwatch, a smart glass and an HMD (head mounted display)), a digital TV, a desktop computer, a digital signage, etc.

Each server in the content streaming system may be operated as a distributed server, and in this case, data received by each server can be processed in a distributed manner.

The embodiments described in the disclosure may be implemented and performed on a processor, a microprocessor, a controller or a chip. For example, the function units illustrated in the drawings may be implemented and performed on a computer, a processor, a microprocessor, a controller or a chip.

Furthermore, the decoder and the encoder to which the disclosure is applied may be included in a multimedia broadcasting transmission and reception device, a mobile communication terminal, a home cinema video device, a digital cinema video device, a camera for monitoring, a video dialogue device, a real-time communication device such as video communication, a mobile streaming device, a storage medium, a camcorder, a video on-demand (VoD) service provision device, an over the top (OTT) video device, an Internet streaming service provision device, a three-dimensional (3D) video device, a video telephony device, and a medical video device, and may be used to process a video signal or a data signal. For example, the OTT video device may include a game console, a Blu-ray player, Internet access TV, a home theater system, a smartphone, a tablet PC, and a digital video recorder (DVR).

Furthermore, the processing method to which the disclosure is applied may be produced in the form of a program executed by a computer, and may be stored in a computer-readable recording medium. Multimedia data having a data structure according to the disclosure may also be stored in a computer-readable recording medium. The computer-readable recording medium includes all types of storage devices in which computer-readable data is stored. The computer-readable recording medium may include Blueray disk (BD), a universal serial bus (USB), a ROM, a PROM, an EPROM, an EEPROM, a RAM, a CD-ROM, a magnetic tape, a floppy disk, and an optical data storage device, for example. Furthermore, the computer-readable recording medium includes media implemented in the form of carriers (e.g., transmission through the Internet). Furthermore, a bit stream generated using an encoding method may be stored in a computer-readable recording medium or may be transmitted over wired and wireless communication networks.

Furthermore, an embodiment of the disclosure may be implemented as a computer program product using program code. The program code may be performed by a computer according to an embodiment of the disclosure. The program code may be stored on a carrier readable by a computer.

In the aforementioned embodiments, the elements and characteristics of the disclosure have been combined in a specific form. Each of the elements or characteristics may be considered to be optional unless otherwise described explicitly. Each of the elements or characteristics may be implemented in a form to be not combined with other elements or characteristics. Furthermore, some of the elements and/or the characteristics may be combined to form an embodiment of the disclosure. The sequence of the operations described in the embodiments of the disclosure may be changed. Some of the elements or characteristics of an embodiment may be included in another embodiment or may be replaced with corresponding elements or characteristics of another embodiment. It is evident that an embodiment may be constructed by combining claims not having an explicit citation relation in the claims or may be included as a new claim by amendments after filing an application.

The embodiment according to the disclosure may be implemented by various means, for example, hardware, firmware, software ora combination of them. In the case of an implementation by hardware, the embodiment of the disclosure may be implemented using one or more application-specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In the case of an implementation by firmware or software, the embodiment of the disclosure may be implemented in the form of a module, procedure or function for performing the aforementioned functions or operations. Software code may be stored in the memory and driven by the processor. The memory may be located inside or outside the processor and may exchange data with the processor through a variety of known means.

It is evident to those skilled in the art that the disclosure may be materialized in other specific forms without departing from the essential characteristics of the disclosure. Accordingly, the detailed description should not be construed as being limitative, but should be construed as being illustrative from all aspects. The scope of the disclosure should be determined by reasonable analysis of the attached claims, and all changes within the equivalent range of the disclosure are included in the scope of the disclosure.

The aforementioned preferred embodiments of the disclosure have been disclosed for illustrative purposes, and those skilled in the art may improve, change, substitute, or add various other embodiments without departing from the technical spirit and scope of the disclosure disclosed in the attached claims.

What is claimed is:

1. An apparatus for decoding an image, comprising:
   a memory storing data for the image; and
   a processor coupled with the memory,
   wherein the processor is configured to:
   partition a current coding tree block into a plurality of coding blocks based on the current coding tree block being out of a boundary of a current picture;
   parse a first syntax element including information whether a current coding block is partitioned into a plurality of subblocks based on the current coding block satisfying a predetermined condition, wherein the current coding block is partitioned into the plurality of subblocks when a value of the first syntax element is 1 and the current coding block is not partitioned when the value of the first syntax element is 0;
   parse a second syntax element including information whether the current coding block is partitioned by using a quad-tree structure based on the first syntax element including information that the current coding block is partitioned;
   parse at least one of a third syntax element including information whether the current coding block is partitioned by using a binary-tree structure or whether the current coding block is partitioned by using a ternary-tree structure and a fourth syntax element including information about a split direction of the current coding block, based on the second syntax element including information that the current coding block is not partitioned by using the quad-tree structure; and
   determine a split mode of the current coding block based on at least one of the first syntax element, the second syntax element, the third syntax element, and the fourth syntax element.

2. The apparatus of claim 1, wherein the processor is configured to partition the current coding tree block into the plurality of coding blocks by using the binary-tree structure or the ternary-tree structure until reaching a valid region in the current coding tree block, and
   wherein the valid region represents a region which is located within the boundary of the current picture in the current coding tree block.

3. The apparatus of claim 1, wherein the processor is further configured to parse a fifth syntax element including information whether quad-tree splitting is allowed based on the current coding tree block being out of the boundary of the current picture, and
   wherein the processor is configured to partition the current coding tree block into the plurality of coding blocks by using the binary-tree structure or the ternary-tree structure, based on the fifth syntax element including information that the quad-tree splitting is not allowed.

4. The apparatus of claim 3, wherein the fifth syntax element is signaled through a Sequence Parameter Set, a Picture Parameter Set, a Tile Group Header, or a header of a Network Abstract Layer unit.

5. The apparatus of claim 1, wherein the processor is configured to partition the current coding tree block into the plurality of coding blocks by using the quad-tree structure when a height or width of the current coding tree block is greater than a maximum transform size of 64.

6. An apparatus for encoding an image, comprising:
   a memory storing data for the image; and
   a processor coupled with the memory,
   wherein the processor is configured to:
   partition a current coding tree block into a plurality of coding blocks, based on the current coding tree block being out of a boundary of a current picture;
   generate a first syntax element including information whether a current coding block is partitioned into a plurality of subblocks based on the current coding block satisfying a predetermined condition, wherein the current coding block is partitioned into the plurality of subblocks when a value of the first syntax element is 1 and the current coding block is not partitioned when the value of the first syntax element is 0;
   generate a second syntax element including information whether the current coding block is partitioned by using a quad-tree structure based on the first syntax element including information that the current coding block is partitioned;
   generate at least one of a third syntax element including information whether the current coding block is partitioned by using a binary-tree structure or whether the current coding block is partitioned by using a ternary-tree structure and a fourth syntax element including information about a split direction of the current coding block, based on the second syntax element including information that the current coding block is not partitioned by using the quad-tree structure; and
   determine a split mode of the current coding block based on at least one of the first syntax element, the second syntax element, the third syntax element, and the fourth syntax element.

7. The apparatus of claim 6, wherein the processor is configured to partition the current coding tree block into the plurality of coding blocks by using the binary-tree structure or the ternary-tree structure until reaching a valid region in the current coding tree block, and wherein the valid region represents a region which is located within the boundary of the current picture in the current coding tree block.

8. The apparatus of claim 6, the processor is further configured to generate a fifth syntax element including information whether quad-tree splitting is allowed based on the current coding tree block being out of the boundary of the current picture, and wherein the processor is configured to partition the current coding tree block into the plurality of coding blocks by using the binary-tree structure or the ternary-tree structure, based on the fifth syntax element including information that the quad-tree splitting is not allowed.

9. The apparatus of claim 8, wherein the fifth syntax element is inserted into a Sequence Parameter Set, a Picture Parameter Set, a Tile Group Header, or a header of a Network Abstract Layer unit.

10. The apparatus of claim 6, wherein the processor is configured to partition the current coding tree block into the plurality of coding blocks by using the quad-tree structure when a height or width of the current coding tree block is greater than a maximum transform size of 64.

* * * * *